United States Patent
Akiyama

(10) Patent No.: US 12,034,850 B2
(45) Date of Patent: Jul. 9, 2024

(54) ENCRYPTION DEVICE, DECRYPTION DEVICE, ENCRYPTION METHOD, DECRYPTION METHOD, AND COMPUTER PROGRAM PRODUCTS

(71) Applicant: KABUSHIKI KAISHA TOSHIBA, Tokyo (JP)

(72) Inventor: Koichiro Akiyama, Setagaya (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 144 days.

(21) Appl. No.: 17/459,320

(22) Filed: Aug. 27, 2021

(65) Prior Publication Data
US 2022/0150064 A1    May 12, 2022

(30) Foreign Application Priority Data
Nov. 12, 2020 (JP) .................. 2020-188737

(51) Int. Cl.
H04L 29/06 (2006.01)
G09C 1/00 (2006.01)
H04L 9/30 (2006.01)

(52) U.S. Cl.
CPC .............. H04L 9/3026 (2013.01); G09C 1/00 (2013.01)

(58) Field of Classification Search
CPC .................. H04L 9/3026; G09C 1/00
(Continued)

(56) References Cited

U.S. PATENT DOCUMENTS

| | | | |
|---|---|---|---|
| 5,740,250 A * | 4/1998 | Moh ............ | H04L 9/3093 380/28 |
| 2002/0001383 A1* | 1/2002 | Kasahara ...... | H04L 9/3093 380/30 |

(Continued)

FOREIGN PATENT DOCUMENTS

JP    2010-204466 A    9/2010

OTHER PUBLICATIONS

Gentry,"Fully Homomorphic Encryption Using Ideal Lattices", Jun. 2, 2009, ACM, pp. 169-178 (Year: 2009).*

(Continued)

*Primary Examiner* — Piotr Poltorak
*Assistant Examiner* — Gregory A Lane
(74) *Attorney, Agent, or Firm* — Oblon, McClelland, Maier & Neustadt, L.L.P.

(57) ABSTRACT

An encryption device includes one or more hardware processors functioning as the following units. A unit acquires, as a public key, n-variable indeterminate equations X having coefficients with a predetermined degree of a univariate polynomial ring $F_p[t]$ on a finite field $F_p$. A unit embeds a plaintext m into coefficients of n-variable plaintext polynomial factors $m_i$ having coefficients with a predetermined degree of the $F_p[t]$. A unit generates an n-variable plaintext polynomial M by multiplying the n-variable plaintext polynomial factors $m_i$ whose number is one or more. A unit randomly generates n-variable polynomials $s_k$ (k=1, 2), n-variable polynomials $r_k$, and noise polynomial $e_k$, each having coefficients with a predetermined degree of the $F_p[t]$. A unit generates a ciphertext $c_k$ by executing an operation including at least one of adding, subtracting, and multiplying the $s_k$, the $r_k$, the $e_k$, and the X to, from, or by the M.

12 Claims, 16 Drawing Sheets

(58) Field of Classification Search
USPC .......................................................... 380/30
See application file for complete search history.

(56) References Cited

U.S. PATENT DOCUMENTS

| | | | |
|---|---|---|---|
| 2004/0151307 A1* | 8/2004 | Wang ................... | H04L 9/3093 380/30 |
| 2010/0226496 A1* | 9/2010 | Akiyama .............. | H04L 9/3093 380/28 |
| 2013/0177151 A1* | 7/2013 | Sella ..................... | H04L 9/3093 380/30 |
| 2016/0119120 A1* | 4/2016 | Wang ................... | H04L 9/0618 380/30 |
| 2018/0034630 A1* | 2/2018 | Rietman ................. | H04L 9/14 |

OTHER PUBLICATIONS

Aly, "Design of Symmetric-Key Primitives for Advances Cryptographic Protocols", 2020, IACR, vol. 2020, pp. 1-45 (Year: 2020).*
Komano et al., "Algebraic Surface Cryptosystems using Polynomial Approximate GCD", Technical Report of IEICE, 116 (130), 2016, 24 pages (with Machine generated translation).

* cited by examiner

FIG.1

Algorithm 1 Approximate GCD algorithm

Require: $f(t), g(t), d$
Ensure: $a(t)$
  Initialize :
  $r0 := f(t); r1 := g(t);$
  $s0 := 1, s1 := 0;$
  $t0 := 0; t1 := 1;$
  Processing :
  while $r1 \neq 0$ do
    $q = r0/r1$
    $dmy := r0 - q \cdot r1$
    $r0 := r1$
    $r1 := dmy$
    $dmy := s0 - q \cdot s1$
    $s0 := s1$
    $s1 := dmy$
    $dmy := t0 - q \cdot t1$
    $t0 := t1$
    $t1 := dmy$
    if $(\deg f(t) - \deg t1 = d) \wedge (\deg g(t) - \deg s1 = d)$ then
      break
    end if
  end while
  if $(s1 = 0) \vee (t1 = 0)$ then
    return 0
  else
    $a(t) := f(t)/t1$
    return $a(t)$
  end if

FIG.2

Algorithm 2 Ideal decomposition algorithm

Require: $f, X$ such that $f = \prod_{\ell=1}^{n} h_\ell + Xr$

Ensure: $h_\ell$ $(1 \leq \ell \leq n)$ $\ell = 1$

Factorize $Res_x(f, X)$ to obtain factor $Res_x(h_k, X)$ ($k=1, \ldots, n$)

Factorize $Res_y(f, X)$ to obtain factor $Res_y(h_v, X)$ ($v=1, \ldots, n$)

for $\kappa = 1$ to $n$ do for $\nu = 1$ to $n$ do

Calculate Glebner basis $G = \{g_1, \ldots, g_s\}$ of ideal $J = (X, Res_x(h_k, X), Res_y(h_v, X))$ Calculate $NF_G(f)$ assuming $h = \sum_{(i,j,k) \in \Delta_h} \mu_{ijk} x^i y^j t^k$ Establish simultaneous equations through comparison using coefficients of each $x^i y^j t^k$ from $NF_G(f)=0$ Solve simultaneous equations to obtain coefficient $\mu_{ijk}$, and obtain factor $h$ if $(h \neq 0)$ then

$h_\ell := h$; $\ell := \ell + 1$ end if end for end for return $h_\ell$ $(1 \leq \ell \leq n)$

FIG.3

| Algorithm 3 Algorithm for adjusting coefficient of indeterminate equation $X(x, y)$ (example) |
|---|
| for $i = \deg X$ to $1$ do |
|     $q(t) = \tau_{00}(t)/u_x(t)^i$ |
|     $\tau_{i0}(t) = \tau_{00} + q(t)$ |
|     $\tau_{00}(t) = \tau_{00}(t) \mod u_x(t)^i$ |
| end for |

ENCRYPTION DEVICE, DECRYPTION DEVICE, ENCRYPTION METHOD, DECRYPTION METHOD, AND COMPUTER PROGRAM PRODUCTS

CROSS-REFERENCE TO RELATED APPLICATIONS

This application is based upon and claims the benefit of priority from Japanese Patent Application No. 2020-188737, filed on Nov. 12, 2020; the entire contents of which are incorporated herein by reference.

FIELD

Embodiments described herein relate generally to an encryption device, a decryption device, an encryption method, a decryption method, and computer program products.

BACKGROUND

Cryptography is a technique widely used for protecting the confidentiality and authenticity of information in a networked society in which people communicate with a large amount of information such as e-mails exchanged over a network. However, even the RSA cryptography and elliptic curve cryptography, which are currently widely accepted versions of the technique, cannot be free of a potential risk of breaking by a practical quantum computer expected to appear in the near future.

BRIEF DESCRIPTION OF THE DRAWINGS

FIG. 1 is a diagram illustrating an example of an approximate GCD algorithm according to an embodiment;

FIG. 2 is a diagram illustrating an example of an ideal decomposition algorithm according to the embodiment;

FIG. 3 is a diagram illustrating an example of an algorithm for adjusting coefficients of an indeterminate equation $X(x, y)$ according to the embodiment;

DETAILED DESCRIPTION

Figure 4:
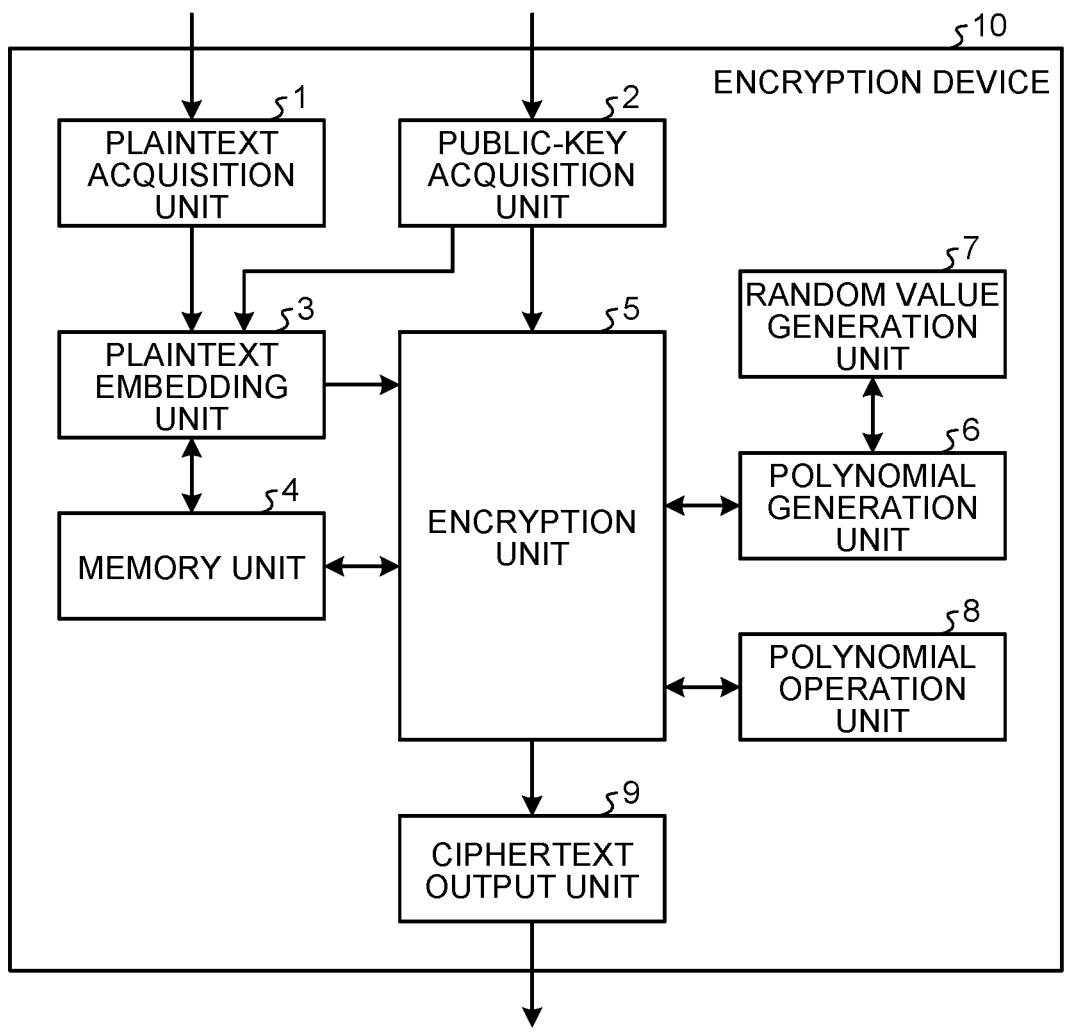
FIG. 4 is a diagram illustrating an example of a functional configuration of an encryption device of an embodiment.

An encryption device according to an embodiment includes one or more hardware processors configured to function as a public-key acquisition unit, a plaintext embedding unit, a polynomial operation unit, a polynomial generation unit, and an encryption unit. The public-key acquisition unit acquires, as a public key, n-variable indeterminate equations $X(x_1, \ldots, x_n)$ having, as coefficients, elements with a predetermined degree or less of a univariate polynomial ring $F_p[t]$ on a finite field $F_p$. The plaintext embedding unit embeds a plaintext m into coefficients of n-variable plaintext polynomial factors $m_i (x_1, \ldots, x_n)$ (i=1 \ldots, m) having, as coefficients, elements with a predetermined degree or less of the univariate polynomial ring $F_p[t]$, a number of the n-variable plaintext polynomial factors being one or m which is larger than one. The polynomial operation unit generates an n-variable plaintext polynomial $M(x_1, \ldots, x_n)$ by multiplying the n-variable plaintext polynomial factors $m_i(x_1, \ldots, x_n)$ whose number is one or m. The polynomial generation unit randomly generates n-variable polynomials $s_k(x_1, \ldots, x_n)$ (k=1, 2) having, as coefficients, elements with a predetermined degree or less of the univariate polynomial ring $F_p[t]$, randomly generates n-variable polynomials $r_k(x_1, \ldots, x_n)$ having, as coefficients, elements with a predetermined degree or less of the univariate polynomial ring $F_p[t]$, and randomly generates noise polynomial $e_k(x_1, \ldots, x_n)$ having, as coefficients, elements with a predetermined degree or less of the univariate polynomial ring $F_p[t]$. The encryption unit generates a ciphertext $c_k(x_1, \ldots, x_n)$ by executing encryption processing of performing an operation including at least one of adding, subtracting, and multiplying the n-variable polynomials $s_k(x_1, \ldots, x_n)$, the n-variable polynomials $r_k(x_1, \ldots, x_n)$, the noise polynomial $e_k(x_1, \ldots, x_n)$, and the n-variable indeterminate equations $X(x_1, \ldots, x_n)$ to, from, or by the n-variable plaintext polynomial $M(x_1, \ldots, x_n)$.

Embodiments of an encryption device, a decryption device, an encryption method, a decryption method, and computer program products will be described in detail below with reference to the accompanying drawings.

Cryptography can be roughly divided into common-key cryptographic technology and public-key cryptographic technology. Common-key cryptography is a cryptographic method based on a data scrambling algorithm. The common-key cryptography enables high-speed encryption/decryption, whereas secret communication and authentication communication can only be performed between two parties each being given a common key in advance. Public-key cryptography is a cryptographic method based on a mathematical algorithm. The public-key cryptography is not as fast as encryption/decryption as common-key cryptography, but it does not require pre-key sharing. Public-key cryptography enables authentication communication by performing secret communication using the public key disclosed by the destination and applying a digital signature using the sender's private key (to prevent impersonation).

For this reason, common-key cryptography is mainly used to encrypt information that needs to be decrypted in real time after reception, such as pay digital broadcasting, and a method is adopted to deliver the decryption key separately used by a key distribution system called a conditional access system only to subscribers. By contrast, online sites on the Internet require encryption to protect customer information (credit card numbers, addresses, and the like) from eavesdropping, but it is not always possible to issue an encryption key in advance; and therefore, public-key cryptography is often used.

Typical examples of public-key cryptography include RSA cryptography and elliptic curve cryptography. In RSA cryptography, the difficulty of the integer factorization problem serves as the basis of security, and the power residue operation is used as the encryption operation. In elliptic curve cryptography, the difficulty of the discrete logarithm problem on an elliptic curve serves as the basis of security, and the point operation on the elliptic curve is used for the encryption operation. For these methods of public-key cryptography, although an attack method for a specific public key has been proposed, a general attack method is not known. Thus, decryption methods for a serious problem regarding security have not been found so far except an attack method by a quantum computer described later.

Other examples of public-key cryptography include knapsack cryptosystem (known as NP problem) with the difficulty of the knapsack problem serving as the basis of security, and cryptosystems based on multivariate polynomials configured by using a field extension theory and with the solution problem of simultaneous equations serving as the basis of security. However, with respect to the knapsack cryptosystem, the attack method is already known in almost all instances, and it cannot be said that the security it provides is quite doubtful.

Although a powerful attack method is known for cryptosystems based on multivariate polynomials, there are also instances in which known attack methods do not work, and thus deterioration in security has become but not become decisive yet. However, the key size required to avoid known attack methods has increased, which come to be seen as a problem.

The RSA cryptography and elliptic curve cryptography, which are currently widely accepted versions of the technique, cannot be free of a potential risk of breaking by a practical quantum computer expected to appear in the near future. A quantum computer is a computer that can perform massively parallel computation (based on a principle different from the present computers) by utilizing a physical phenomenon called entanglement known in quantum mechanics. The quantum computer is a virtual computer the operation of which has been confirmed only at the experimental level so far, but research and development for its implementation are underway. In 1994, Shor showed that an algorithm for efficiently solving integer factorization and discrete logarithm problems can be constructed, using this quantum computer. That is, when the quantum computer becomes available, the RSA cryptography based on the integer factorization problem and the elliptic curve cryptography based on the discrete logarithm problem (on the elliptic curve) will be solved efficiently.

Under such circumstances, research on public-key cryptography, which has the possibility of maintaining security even if a quantum computer becomes available, has been conducted in recent years. Lattice-based cryptography is an example of public-key cryptography that is still considered feasible at present and difficult to break even with a quantum computer. Lattice-based cryptography is a type of public-key cryptography the security of which is based on the problem of finding the closest point, among the points other than an origin, to the origin (shortest vector problem) in the discrete n-dimensional vector space (linear space) called lattice.

The shortest vector problem is an NP-hard problem, but since it is a linear problem, small-sized problems can be easily solved. Therefore, the number of dimensions for achieving security is increased, the key size of a public key, a private key, or the like is increased, and there is little possibility of applying it especially to a low-end device. Furthermore, public-key cryptography requires a larger circuit scale and takes a longer processing time than common-key cryptography, so that there is a problem in that it cannot be implemented in a low power environment, such as a mobile terminal, or it takes a long processing time even if it is implemented. For this reason, there is a demand for public-key cryptography that can be realized even in a low power environment.

In general, public-key cryptography is configured to find difficult-to-calculate problems (such as the integer factorization problem and discrete logarithm problem), and break a ciphertext (without knowing the private key) in such a way that is equivalent to solving the difficult-to-calculate problems. However, conversely, even if one problem that is difficult to calculate is defined, it is not always possible to easily construct public-key cryptography that uses that problem as the basis of security. This is because when the security is based on a problem that is too difficult to calculate, the problem of generating a key will also be difficult and cannot be configured. On the other hand, when the problem is made easy enough to enable key generation, breaking the key will become easy accordingly.

Creativity is thus required to configure public-key cryptography in finding a difficult-to-calculate problems and changing it into a problem with a fine balance such that the problem is easy enough to generate a key but not easy to break (decrypt without knowing the generated private key). Since such a configuration is difficult to make, only several examples of public-key cryptography have been proposed so far. Under such circumstances, public-key cryptography (JP 2010-204466 A) is proposed, using an algebraic surface that cannot be efficiently broken even with a calculation by a quantum computer and that is expected to be processed at high speed even in a low power environment.

The public-key cryptography disclosed in JP 2010-204466 A has a private key as two sections corresponding to an algebraic surface $X(x,y,t)$ and a public key as the algebraic surface $X(x,y,t)$, and includes polynomial generation means and encryption means. The polynomial generation means performs processing of embedding a plaintext m in a plaintext polynomial $m(x,y,t)$ and generating a random polynomial $h(x,y,t)$, $s_1(x,y,t)$, $s_2(x,y,t)$, $r_1(x,y,t)$, $r_2(x,y,t)$ of three variables x, y, t. The encryption means generates two ciphertexts $c_1=E_{pk}(m,s_1,r_1,h,X)$ and $c_2=E_{pk}(m,s_2,r_2,h,X)$ from the plaintext polynomial $m(x,y,t)$ through encryption processing of performing operation including at least one of addition, subtraction, and multiplication of each polynomial and a definition expression $X(x,y,t)$. The public-key cryptography disclosed in JP 2010-204466 A was broken since there were two ciphertexts without any noise term, although the ciphertexts had nonlinearity.

Non Patent Literature (Yuichi KOMANO, Koichiro AKIYAMA, Yasuhiro GOTO, Koji NUTA, and Goichiro KAOKA, "Algebraic curved surface encryption method using approximation GCD of polynomial", IEICE Technical Journal, 116 (130), pp. 217 to 222 (2016)) proposes a cryptographic method with noise. This cryptographic method has a private key as a single section corresponding to an algebraic surface X(x,y,t), and includes first polynomial generation means, second polynomial generation means, and encryption means. Assuming that a public key serves as the algebraic surface X(x,y,t), the first polynomial generation means performs processing of embedding a plaintext m in a plaintext polynomial m(x,y,t) and generating a random polynomial $s_1(x,y,t)$, $s_2(x,y,t)$, $r_1(x,y,t)$, $r_2(x,y,t)$ of three variables x, y, t. The second polynomial generation means generates noise polynomials $e_1(x,y,t)$ and $e_2(x,y,t)$. The encryption means generates two ciphertexts $c_1=E_{pk}(m, s_1,r_1,e_1,X)$, $c_2=E_{pk}(m,s_2,r_2,e_2,X)$ from the plaintext polynomial m(x,y,t) through encryption processing of performing operation including at least one of addition, subtraction, and multiplication of each above-described polynomial and the above-described definition expression X(x,y,t). This cryptographic method has nonlinearity with the ciphertext involving multiplication of an unknown part such as $m(x,y)s_1(x,y)$, $m(x,y)s_2(x,y)$, but these are simple products of the plaintext polynomial m(x,y) and random polynomials $s_1(x,y)$ and $s_2(x,y)$. Therefore, there has been a problem in that a decryptable and safe parameter cannot be with the security analysis as described in the present embodiment performed.

In the following, in view of such a current situation, an embodiment will explain public-key cryptography that has the possibility of ensuring security even if a practical quantum computer appears and that can eliminate vulnerability. Specifically, public-key cryptography that can eliminate vulnerability is constructed by hiding a private key in a nonlinear polynomial so that one ciphertext can have a nonlinear structure and adding noise.

Explanation of Algebra

First of all, the algebra used in the embodiment will be defined. To begin with, Z represents a set of integers, and $Z_p$ represents the coset of the integer Z corresponding to a natural number p. $Z_p$ is a remainder and is generally described as $Z_p=\{[0], [1], \ldots, [p-1]\}$. With the elements of $Z_p$, the followings hold, whereby addition, subtraction, and multiplication are defined.

$$[a]+[b]=[a+b]$$

$$[a]-[b]=[a-b]$$

$$[a]\cdot[b]=[a\cdot b]$$

A set is referred to as a ring, which enables the operations of addition, subtraction, and multiplication to be defined as described above and satisfies associativity. The ring includes additive identify 0 as well as an inverse element $[-x]([x]+[-x]=[0]$ that results in 0 when added to an element x other than 0. A ring with which the commutative law $([a]+[b]=[b]+[a],[a]\cdot[b]=[b]\cdot[a])$ is established is referred to as a commutative ring. If the ring further includes a unit element [1] for multiplication, the ring is referred to as a commutative ring with unit element.

The division operation can be defined only for [b] with an element [x] satisfying $[b]\cdot[x]=[x]\cdot[b]=[1]$. When such an element [x] exists, the element [x] is referred to as an inverse element of [b] and is expressed as $[b^{-1}]$. Thus, division [a]/[b] with [b] with an inverse element is calculated by multiplying [a] by the inverse element $[b^{-1}]([a]\cdot[b^{-1}])$ satisfying the following.

$$[b]\cdot[b^{-1}]=[1]$$

The element [b] in $Z_p$ has the inverse element $[b^{-1}]$ under a necessary and sufficient condition GCD(b,q)=1. Specifically, the element [b] in $Z_p$ has the inverse element $[b^{-1}]$ only when b and p are coprime (relatively prime). For example, when p is 5 and b is 3, these numbers are coprime, and thus the inverse element is obtained as $[3^{-1}]=[2]$. However, when p is 6, GCD(3,6)=3 holds, the numbers are not relatively prime, and thus the division cannot be defined due to the lack of the inverse element.

Meanwhile, [0] represents a set of numbers that can be divided by p without a remainder. It can be more explicitly expressed as the following.

$$[0]=\{\ldots,-2p,-p,0,p,2p,\ldots\}$$

All the elements of the set [0] results in the same answer in the calculation defined with $Z_p$. Thus, for the sake of simplicity, the calculation is assumed to be performed using a single element (representative element) in the set [0]. The representative element may be any element included in this set (due to the feature described above), and is set to be 0 in the embodiment. Similarly, the smallest integers in [1] and [2] (1 and 2, respectively) are used as the representative element, and $\{0, 1, \ldots, q-1\}$ is used as the representative for $Z_p$.

When p is a prime number, all representative elements other than 0 are coprime to p, whereby division can be defined. Thus, when p is a prime number, addition, subtraction, multiplication and division can be defined with $Z_p$. Such a set that is a commutative ring with elements other than 0 having inverse elements is known as a field. In particular, a field, such as $Z_p$ where p is a prime number, including a limited number of elements is referred to as a finite field. The finite field is either a field with the number of elements therein being a prime number or a field with the number of elements being a prime power, and the former is referred to as a prime field. Note that $Z_p$ mentioned herein is a prime field.

Next, the notation and definitions related to polynomials will be described. $F_p[t]$ represents a set of univariate polynomials, where a prime field $F_p$ is a coefficient. It should be quite obvious that addition, subtraction, and multiplication can be defined with $F_p[t]$. However, division of polynomials cannot be defined, except for the polynomials including constant terms only, due to the lack of inverse element.

Notation of Multivariate Polynomial

Next, terms and symbols for bivariate polynomials will be defined. First of all, a bivariate polynomial on the ring R is expressed by the following Formula (1).

$$\xi(x, y) = \sum_{(i,j)\in\Gamma_\xi} \tau_{i,j}(t)x^i y^j \tag{1}$$

In Formula (1), $\tau_{i,j}(t)$ represents the element of the univariate polynomial ring $F_p[t]$. A set $\Gamma_\xi$ is a set of exponents (i (x exponent),j (y exponent)) of non-zero monomial expressions in a polynomial $\xi(x,y)$, and is referred to as a term set of the bivariate polynomial $\xi(x,y)$.

For example, a term set of the polynomial on $Z_7$ in the following Formula (2) is expressed by the following Formula (3).

$$\xi(x, y) = 5x^3 + 3x^2 y + y^2 + 4x + 1 \quad (2)$$

$$\Gamma_\xi = \{(3,0),(2,1),(0,2),(1,0),(0,0)\} \quad (3)$$

The number of elements of $\Gamma_\xi$ matches the number of monomials of the bivariate polynomial $\xi(x,y)$. In the following, $\xi(x,y)$ being clearly a bivariate polynomial may be simply written as $\xi$.

In the embodiment, for the sake of simplicity, the term set of the bivariate polynomial of the degree D is defined as the maximum term set denoted by $\Gamma_D$. Specifically, when D=2, the following Formula (4) holds, and when D=3, the following Formula (5) holds.

$$\Gamma_2 = \{(2,0),(1,1),(0.2),(1,0),(0,11),(0,0)\} \quad (4)$$

$$\Gamma_3 = \{(3,0),(2,1),(1,2),(0,3),(2.0),(1.1),(0.2),(1,0),(0,1),(0,0)\} \quad (5)$$

The $\Gamma_3$ includes the term set $\Gamma_\xi$ of the foregoing Formula (3) as a subset.

When the term set $\Gamma_D$ is given, a set of bivariate polynomials on the univariate polynomial ring $F_p[t]$ having the term set $\Gamma_D$ is defined by the following Formula (6).

$$\mathcal{F}_{\Gamma_D}/\mathbb{F}_p[t] = \left\{ f \in \mathbb{F}_p[x, y] \mid f = \sum_{(i,j) \in \Gamma_D} a_{i,j}(t) x^i y^j \right\} \quad (6)$$

In Formula (6), $a_{i,j}(t)$ is an element on $F_p[t]$. The left side of Formula (6) may be simply referred to as $F_{TD}$. The following Formula (7) represents a case where the degree of this coefficient $a_{i,j}(t)$ is limited to be not larger than d, which may also be simply referred to as $F_{TD,d}$.

$$\mathcal{F}_{\Gamma_{D,d}}/\mathbb{F}_p[t] = \left\{ f \in \mathbb{F}_p[x, y] \mid f = \sum_{(i,j) \in \Gamma_D} a_{i,j}(t) x^i y^j \text{ s.t. deg } a_{i,j}(t) \le d \right\} \quad (7)$$

The following Formula (8) expresses the bivariate polynomial on the univariate polynomial ring $F_p[t]$, as a trivariate polynomial.

$$\xi(x, y) = \sum_{(i,j,k) \in \Delta_\xi} \mu_{i,j,k} x^i y^j t^k \quad (8)$$

In the formula, $\mu_{i,j,k}$ is an element of the finite field $F_p$. A set $\Delta_\xi$ is a set of exponents (i (x exponent), j (y exponent), k (t exponent)) of non-zero monomial expressions in a polynomial $\xi(x,y)$, and is referred to as a term set of the trivariate polynomial $\xi(x,y)$.

The following Formula (10) indicates a term set of a polynomial on $F_7$ expressed by Formula (9).

$$\xi(x, y) = (t^2 + 2t + 6)x^2 + (3t + 5) y^2 + (4t^2 + 1)x + 4t^2 + t + 3 \quad (9)$$

$$\Delta_\xi = \{(2,0,2),(2,0,1),(2,0,0),(0,2,1),(0,2,0)(1,0,2),(1,0,0),(0,0,2),(0,0,1),(0,0,0)\} \quad (10)$$

The number of elements of $\Delta_\xi$ matches the number of monomials of the trivariate polynomial $\xi(x,y,t)$. In the following, $\xi(x,y,t)$ that is clearly a trivariate polynomial may be simply written as $\xi$.

Note that the notation of the maximum term set corresponds to the notation of the bivariate polynomial. Specifically, the maximum term set with the degree of each coefficient $a_{i,j}(t)$ limited so as not to exceed d with the degree D related to the trivariate polynomial x,y will be referred to as $\Delta_{D,d}$.

For example, when D=2 and d=1 are given, the following Formula (11) is obtained.

$$\Delta_{2,1} = \{(2,0,1),(2,0,0)(1,1,1)(1,1,0),(0,2,1),(0,2,0),(1,0,1),(1,0,0),(0,1,1),(0,1,0)(0,0,1),(0,0,0)\} \quad (11)$$

Solution and Zero Point

A pair of elements $(u_x(t), u_y(t))$ on the univariate polynomial ring $F_p[t]$ satisfying the equation $X(x,y)=0$ on the univariate polynomial ring $F_p[t]$ is referred to as the solution of the equation $X(x,y)=0$. In a case where $X(x,y)$ is regarded as a polynomial, the solution of the equation $X(x,y)=0$ is referred to as a zero point of $X(x,y)$.

Approximate GCD Calculation for Univariate Polynomial

It is a well-known fact that a(t), as a Greatest Common Divisor (GCD) of polynomials f(t) and g(t) on the univariate polynomial ring $F_p[t]$ is obtained by the Euclidean algorithm. A description will be given on approximate GCD calculation in a case where small-degree noises e1(t) and e2(t) are respectively added to these (t) and g(t) The calculation for this approximate GCD plays an important role in the decryption of the cryptographic method of the embodiment.

It has been known that GCD a(t) of the degree d can be obtained using "Algorithm 1" illustrated in FIG. 1 when the polynomials f(t) and g(t) on $F_p[t]$ of the following Formula (12) satisfy the condition of the following Formula (13).

$$\begin{cases} f(t) = a(t)s_1(t) + e_1(t) \\ g(t) = a(t)s_2(t) + e_2(t) \end{cases} \quad (12)$$

$$\begin{cases} \deg a(t) \ge 2\deg s_k(t) \\ \deg s_k(t) > \deg e_k(t) \end{cases} \quad (13)$$

$$(k = 1, 2)$$

This algorithm is based on the idea of the extended Euclidean algorithm, and enables efficient processing. In the present embodiment, a(t) is referred to as approximate GCD of f(t) and g(t).

Ideal Decomposition of Multivariate Polynomial

A factorization (ideal decomposition) problem using an ideal in the multivariate polynomial ring Fp[t][x,y] will be defined, and one solution algorithm therefor will be described. The ideal decomposition is a problem for obtaining $h_j(\in Fp[t][x,y])$ (j=1, . . . , n) when two elements X and $f(=\Pi_{j=1}^n h_j + X_r)$ of $F_p[t][x,y]$ are given. Here, r is also an element of $F_p[t][x,y]$, and thus the problem can be regarded as a factorization problem of the polynomial f in the remainder ring $F_p[t][x,y]/(X)$.

A finite set of the multivariate polynomial ring $F_p[t][x,y]$ is referred to as G={$g_1, \ldots, g_s$}. It has been known that in this case, a polynomial $q_i(h_j(\in Fp[t][x,y])$ exists for any polynomial $f(\in Fp[t][x,y])$, and that LM(r) is not dividable LM($g_i$) with r=0 or with any i in the following Formula (14).

$$r = f - \sum_{i=1}^{s} q_i g_i \qquad (14)$$

Here, LM(r) indicates a monomial that comes in first in the monomial order defined for the multivariate polynomial ring $F_p[t]$. For example, when the order of x>y>t is defined, the order of monomials is prioritized in the order of x, y, and t, and in the case of monomials containing the same variables, those having higher exponents come first in this order. When the polynomial of Formula (9) is expressed as r, the monomial order of r is $t^2x^2$, $2tx^2$, $6x^2$, $4t^2x$, x, $3ty^2$, $5y^2$, $4t^2$, t, and 3, and LM(r)=$t^2x^2$ holds.

Transformation of f as in the above Formula (14) using a finite set G is referred to as normalization of f by G, and r is referred to as a normal form of G and written as $NF^G(f)$. In addition, when the set G is set to what is known as a Grebner basis for the ideal J of a polynomial, a normal form of an arbitrary element f included in the ideal J becomes 0. Thus, this has been known to be writable as in the following Formula (15).

$$f - \sum_{i=1}^{s} q_i g_i = 0 \qquad (15)$$

In Formula (15), $q_i$ is an element of Fp[t][x,y].

It has been known that the following Formula (16) is obtained through calculation of a resultant of f and X.

$$Res_x(f, X) = \qquad (16)$$
$$Res_x\left(\prod_{\kappa=1}^{n} h_\kappa + Xr, X\right) = Res_x\left(\prod_{\kappa=1}^{n} h_\kappa + X\right) = \prod_{\kappa=1}^{n} Res_x(h_\kappa, X)$$

In Formula (16), $Res_x(f,X)$ is a resultant relating to a variable x. Also for the variable y, the resultant can be similarly calculated with the following Formula (17).

$$Res_y(f, X) = \prod_{\kappa=1}^{n} Res_y(h_\kappa, X) \qquad (17)$$

Here, the ideal J is defined by the following Formula (18).

$$J = (X, Res_x(h_j, X), Res_y(h_j, X)) \qquad (18)$$

Since J substantially matches $(h_j, X)$ and $h_j \in J$ holds, 0 is obtained when the Grebner basis G of the ideal J is calculated, and a normal form of $h_j$ based on G is calculated. Here, $h_j$ is simply written as h for simplicity, and h is expressed by the following Formula (19).

$$h = \sum_{(i,j,k) \in \Delta_\kappa} \mu_{ijk} x^i y^j t^k \qquad (19)$$

Here, $\mu_{ijk}$ is a variable with a value $F_p$. The normal form of h based on G is calculated as in the following Formula (20).

$$NF_G(h) = \sum_{(i,j,k) \in \Delta_\kappa} \mu_{ijk} NF_G(x^i y^j t^k) = 0 \qquad (20)$$

A simultaneous linear equation is obtained through comparison between coefficients of $x^i y^j t^k$ in both sides. With the solution $\mu_{ijk}$ of this equation, h can be restored.

On the other hand, actually, $Res_x(h_j, X)$ and $Res_y(h_j, X)$ are factors of $Res_x(f, X)$ and $Res_y(f, X)$, respectively, and h, can only be restored with the correct combination of these. Based on these, it can be understood that the ideal decomposition is achieved by Algorithm2 illustrated in FIG. 2, Indeterminate Equation and its Solution Problem An indeterminate equation can be defined as an equation with the number of variables being larger than the number of expressions (included in the equation). The indeterminate equations feature a small number of constraints and a high degree of freedom of solution, and thus in many cases yield a plurality of (in some cases, like its name, indeterminate number of) solutions if any. In fact, the indeterminate equations with an integer coefficient yield innumerable real (or complex) solutions, some of which can be easily obtained as an approximate solution. Unfortunately, this does not usually work for equations that solution of which is in a discrete set such as an integer solution of an indeterminate equation with an integer coefficient. Therefore, some theoretical means for narrowing down is required. However, it has been known that generally, whether there is a solution cannot be determined with such means for narrowing down performed for a limited number of times (unsolvable problem).

An indeterminate equation cryptosystem proposed in the embodiment has the following definitions, and is dependent on, in terms of security, a solution problem for obtaining a univariate polynomial solution of an indeterminate equation X(x,y)=0 defined on the univariate polynomial ring $F_p[t]$, and this problem is defined as follows.

Definition 1 (Solution problem for indeterminate equation on univariate polynomial ring $F_p[t]$)

A problem of obtaining a univariate polynomial solution $u_x(t)$, $u_y(t)$ on $F_p[t]$ when the indeterminate equation X(x,y)=0 defined on the univariate polynomial ring $F_p[t]$ is given is referred to as a solution problem for an indeterminate equation on the univariate polynomial $F_p[t]$ or a section finding problem In the algebraic surface X(x,y) defined on the finite field $F_p$.

In the following, a key generation algorithm and an encryption/decryption algorithm for the indeterminate equation cryptosystem of the embodiment will be described. In this method, the plaintext M is dispersedly embedded in a plurality of plaintext polynomial factors $m_i(x,y)$. Specifically, assuming that a plaintext polynomial in which the plaintext is directly embedded in the coefficient is M(x,y), k polynomials $m_i(x,y)$ (i=1, . . . , k), referred to as plaintext polynomial factors, are prepared for $m_i(x,y)$, and are dispersedly embedded so that the following Formula (21) can be obtained.

$$M(x, y) = \sum_{i=1}^{k} m_i(x, y) \qquad (21)$$

A specific embedding method will be described later in "Plaintext Embedding". Meanwhile, also in the decryption, the structure only allows the plaintexts to be restored when the factor $m_i(x,y)$ (i=1, . . . , k) is obtained through factorization after $\Pi_{i=1}^{k} m_i(x,y)$ has been restored. In the following, for the sake of simplicity, the degree of x,y of $m_i(x,y)$, in terms of polynomial, is set to be 1, and an explanation is given only on a plaintext polynomial with a factor only including polynomials that can be expressed as $m_i(x,y) = m_{x,i}(t)x + m_{y,i}(t)y + m_{I,i}(t)$.

Furthermore, the following algorithms are provided with example numerical values of a small size. It should be noted that values of a small size are used for the sake of understanding, and the security of the encryption cannot be guaranteed with such values.

System Parameter

System parameters, which include parameters used in the algorithms, are for guaranteeing security and decryptability. The system parameter includes an arbitrarily settable independent parameter and a dependent parameter derived from the independent parameter. The parameters are defined as follows. The independent parameters are the following 1 to 7.

1. Prime number p indicating the size of the prime field $F_p$
   Example: p=7
2. Degree d of solution $(u_x(t), u_y(t))$
   In the embodiment, $d_x = \deg u_x(t) = \deg u_y(t)$ is assumed to hold.
   Example: d=9
3. Degree $D_X$ of a (nonlinear) indeterminate equation $X(x,y)$ expressed by the following Formula (22)
   Example: $D_X=2$ $$X(x, y) = \sum_{(i,j) \in \Gamma_{D_X}} \tau_{ij}(t) x^i y^j \quad (22)$$

4. Degree $D_m$ of a plaintext polynomial $M(x,y)$ expressed by the following Formula (23)
   Example: $D_m=2$ $$M(x, y) = \prod_{i=1}^{D_m} m_i(x, y) \quad (23)$$

5. Degree $D_r$ of a random polynomial $r(x,y)$ expressed by the following Formula (24)
   Example: $D_r=1$ $$r(x, y) = \sum_{(i,j) \in \Gamma_{D_r}} r_{ij}(t) x^i y^j \quad (24)$$

6. Degree $D_s$ of a random polynomial $s(x,y)$ expressed by the following Formula (25)
   Example: $D_s=1$ $$s(x, y) = \sum_{(i,j) \in \Gamma_{D_s}} s_{ij}(t) x^i y^j \quad (25)$$

7. Degree $D_e$ of a noise polynomial $e(x,y)$ expressed by the following Formula (26)
   Example: $D_e=0$ $$e(x, y) = \sum_{(i,j) \in \Gamma_{D_e}} e_{ij}(t) x^i y^j \quad (26)$$

Here, in order to avoid a linear algebra attack described later, the condition of the following Formula (27) needs to be satisfied.

$$D_m + D_s = D_X + D_r \quad (27)$$

The dependent parameters dependent on the independent parameters described above are the following 1 to 5.

1. Degree $d_X$ of each coefficient $\tau_{ij}(t)$ of the indeterminate equation $X(x,y)$ (i=1, . . . , $D_X$)
   Example: $d_X = d - 1$
2. Degree $d_m$ of each coefficient of the plaintext polynomial factor $m_j(x,y)$ (j=1, . . . , $D_m$)
   Example: $d_m = 2$
3. Degree $d_r$ of each coefficient $r_{ij}(t)$ of the random polynomial $r_k(x,y)$ (k=1, 2)
   Example: $d_r = 2$
4. Degree $d_s$ of each coefficient $s_{ij}(t)$ of the random polynomial $s_k(x,y)$ (k=1, 2)
   Example: $d_s = 2$
5. Degree $d_e$ of each coefficient $e_{ij}(t)$ of the noise polynomial $e_k(x,y)$ (k=1, 2)
   Example: $d_e = 2$ Here, in order to avoid a linear algebra attack described later, the condition of the following Formula (28) needs to be satisfied $$D_m d_m + D_s d_s = D_X d_X + D_r d_r \quad (28)$$

Key

The key of the public-key cryptography includes a private key and a public key. The key of the embodiment will be described in detail below. To begin with, the private key is the solution u of the indeterminate equation X expressed by the following equation (29).

$$u:(x, \mathcal{Y}) = (u_x(t), u_y(t)) (\in \mathbb{F}_p[t]^2) \quad (29)$$

Example: The solution u is expressed by the following Formula (30) when d=9 and p=7.

$$u_x(t), u_y(t)) = (5t^9 + 2t^8 2t^7 + 2t^5 + 2t^4 + 5t^3 + 4^2 + 5t, 6t^9 + 2t^8 + 2t^7 + 5t^6 + t^5 + t^3 + 3t^2 + 4) \quad (30)$$

The public key is the indeterminate equation $X(x,y)$ expressed by the following Formula (31).

$$X(x, \mathcal{Y}) = \Sigma_{(i,j) \in \Gamma_x} \tau_{i,j}(t) x^i \mathcal{Y}^j \quad (31)$$

Here, the solution of $X(x,y)=0$ includes the private key u. Specifically, $X(u_x(t), u_y(t)) = 0$.

Key Generation

The private key and the public key are generated by executing the following processing with the above-described system parameters used as inputs. The private key (polynomials $u_x(t)$, $u_y(t)$, and $(\in F_p[t])$) are uniformly and randomly generated under the condition $\deg u_x(t) = \deg u_y(t) = d$.

Example: When d=9 and p=7, the private key is expressed by the above-described Formula (30).

Note that this private key $u_x(t)$, $u_y(t)$, and ($\in F_p[t]$) can be compressed to $u_x(t)$ ($\in F_p[t]$) only. This is because when $u_x(t)$ is known, $u_y(t)$ can be relatively easily derived by solving the univariate equation $X(u_x(t),y)=0$ on $F_p[t]$. Therefore, in the embodiment, $u_x(t)$ is defined as a compressed private key.

The public key can be generated by the following methods 1 to 3.

1. Terms other than a constant term $\tau_{00}(t)$ are uniformly and randomly generated from the term set $\Gamma_{Dx,dx}$ of the indeterminate equation.

A specific generation method includes a step of setting (a) and a step of executing the following i and ii with respect to each element (i,j) of (b).

(a): $X(x,y)=0$
(b): $\Gamma_{Dx}$(except for (0,0))
i: Uniformly and randomly generate a polynomial $\tau_{ij}(t)$ of the degree $d_X$ from $F_p[t]$
ii: $X(x,y)=X(x,y)+\tau_{ij}(t)x^i$ Example: When p=7, d=9, and $D_X$=2, X(x,y) is expressed by the following Formula (32).

$$X(x,y)=(4t^8+4t^7+6t^6+5t^5+4t^4+3t^2+3t+5)x^2+(5t^8+4t^7+\\4t^6+4t^5+3t^4+3t^3+4t^2+4t+3)xy+(6t^8+6t^7+2t^6+t^5+\\3t^4+t^3+3t^2+2t+6)y^2+(6t^8+4t^6+3t^5+5t^3+4t^2+\\5t+6)x+(3t^86t^7+t^6+4t^5+2t^4+2t^3+4t^2+6t+3)y \quad (32)$$

2. The constant term $\tau_{00}(t)$ is calculated with the following Formula (33)

$$\tau_{00}(t) = -\sum_{(i,j)\in \Gamma_{D_X}-(0,0)} \tau_{ij}(t)u_x(t)^i u_y(t)^j \quad (\in \mathbb{F}_p[t]) \quad (33)$$

In the case of the example of the above Formula (32), the constant term $\tau_{00}(t)$ is expressed by the following Formula (34).

$$\tau_{00}(t)=4t^{26}+3t^{25}+3t^{24}+t^{22}+3t^{21}+t^{19}+4t^{18}+3t^{17}+6t^{16}+\\t^{15}+6t^{14}+6t^{13}+2t^{12}+5t^{11}+2t^{10}+5t^8+t^7+4t^6+3t^5+\\2t^4+5t^3+4t^2+5t+1 \quad (34)$$

When the constant term $\tau_{00}(t)$ of the above Formula (34) is added to the above Formula (32), X(x,y) is expressed by the following Formula (35).

$$X(x,y)=(4t^8+4t^7+6t^6+5t^5+4t^4+3t^2+3t+5)x^2+(5t^8+4t^7+\\4t^6+4t^5+3t^4+3t^3+4t^2+4t+3)xy+(6t^8+6t^7+2t^6+t^5+\\3t^4+t^3+3t^2+2t+6)y^2+(6t^8+4t^6+3t^5+5t^3+4t^2+\\5t+6)x+(3t^86t^7+t^6+4t^5+2t^4+2t^3+4t^2+6t+3)\\y+4t^{26}+3t^{25}+3t^{24}+t^{22}+3t^{21}+t^{19}+4t^{18}+3t^{17}+\\6t^{16}+t^{15}+6t^{14}+6t^{13}+2t^{12}+5t^{11}+3t^{10}+5t^8+t^7+4t^6+\\3t^5+2t^4+5t^3+4t^2+5t+1 \quad (35)$$

As can be seen in the formula, X(x,y) has coefficients with the degree of the coefficient of the constant term being 26, which is much higher than the order 8 of the other terms. This is because the degree being $d \cdot \deg X(x,y)+d_X$ is obtained according to the calculation Formula (33) for $\tau_{00}(t)$. In the present embodiment, in order to adjust this degree to the degree of other coefficients, adjustment is performed by the following method 3.

3. Adjustment of the Indeterminate Equation $X(x\ y)$

The indeterminate equation X(x,y) with the solution $(u_x(t),u_y(t))$ has the same solution $(u_x(t),u_y(t))$ after a deformation $X(x,y)+q(t)x^iy^i-q(t)u_x(t)^iu_y(t)^j$ for arbitrary univariate polynomial q(t). Here, the following Formula (36) is obtained with i being an integer within a range of $0 \leq i \leq \deg X(x,y)$.

$$\begin{cases} q(t) = \tau_{00}(t)/u_x(t)^i \\ r(t) = \tau_{00}(t) \bmod u_x(t)^i \end{cases} \quad (36)$$

Here, $\tau_{00}(t)=q(t)u_x(t)^i+\tau_{00}'(t)$ and $\deg \tau_{00}'(t)<\deg u_x(t)^i$ hold. Thus, through the deformation $X'(x,y)=X(x,y)+q(t)x^i-q(t)u_x(t)^i$ the constant term can be $\tau_{00}'(t)$, whereby the degree can be reduced.

Note that, when this method is used with dx=d−1, the degrees of all the coefficients match, and terms other than the adjusted term $x^2,x$ and the constant term will be those randomly selected in Step 1. In view of this, X(x,y) is generated in steps 1 and 2 with dx=d−1, and the deformation is applied to the terms in the order of degrees, whereby $\deg \tau_{ij}(t)=d-1$ can be obtained for arbitrary $(i,j)(\in \Gamma_x)$, with the degree of the constant term $\tau_{00}(t)$ sequentially reduced without increasing the degree of each coefficient. The detail of the algorithm is indicated by Algorithm 3 in FIG. 3.

As a result, X(x,y) is expressed by the following Formula (37).

$$X(x,y)=(t^8+2t^7+t^6+t^5+2t^4+5t^3+6t^2+2t+5)x^2+(5t^8+4t^7+\\4t^6+4t^5+3t^4+3t^3+4t^2+4t+3)xy+(6t^8+6t^7+2t^6+t^5+\\3t^4+t^3+3t^2+2t+6)y^2+(2t^8+3t^7+6t^6+4t^5+2t^4+5t^3+\\4t^2+6t+1)x+(3t^8+6t^7+t^6+4t^5+2t^4+2t^3+4t^2+6t+3)\\y+2t^8+4t^7+5t^6+2t^5+5t^4+2t^3+5t^2+2t+2 \quad (32)$$

Compression of Public Key

As is clear from the public key generation algorithm described above, the coefficients (other than $x'(i=0,\ldots D_X)$) of the terms of the indeterminate equation X(x,y) serving as the public key are randomly generated. Therefore, this portion can be generated by disclosing only the seed of the random number and using a specific pseudo random number generation function, a hash function, or the like. Therefore, only coefficients of the seed and the adjusted part need to be disclosed, and the size of the public key is compressed. In the example of the above Formula (37), only part of the following Formula (38) is disclosed as the actual coefficient, and the other terms can be generated by disclosing the seed (which usually has the bit length of the security parameter only).

$$X(x,y)=(t^8+2t^7+t^6+t^5+2t^4+5t^3+6t^2+2t+5)x^2+(2t^8+3t^7+\\6t^6+4t^5+2t^4+5t^3+4t^2+3t+1)x+2t^8+4t^7+5t^6+2t^5+\\5t^4+2t^3+5t^2+2t+2 \quad (38)$$

According to this, the compression can be performed to approximately ½ in the case of the degree 2, approximately ⅖ in the case of the order 3, and approximately ⅓ in the case of the order 4.

Encryption

Next, the encryption processing according to the embodiment will be described.

Plaintext Embedding

In the embodiment, the plaintext polynomial for embedding the plaintext has the product structure as expressed in the above Formula (23), and thus direct embedding is not an option. Therefore, an encryption device of the embodiment disperses and embeds plaintext into plaintext polynomial factors $m_i(x,y)$ $(i=1,\ldots,D_m)$. The factor $m_j(x,y)$ of the plaintext polynomial can be expressed as $m_j(x,y)=m_{j,x}(t)x+m_{j,y}(t)y+m_{j,1}(t)$ as described above. The degree of each of the coefficients $m_{j,x}(t)$, $m_{j,y}(t)$, and $m_{j,3}(t)$ is $d_m$. The encryption device of the embodiment performs p-adic expansion on a plaintext M as expressed by the following Formula (39).

$$M = (a_{d_m} a_{d_m-1} \ldots a_1 a_0)_{(p)} \tag{39}$$

The plaintext M is embedded in elements of $F_p[t]$ as in the following Formula (40).

$$a_{d_m} t^{d_m} + a_{d_m-1} t^{d_m-1} + \ldots + a_1 t + a_0 \tag{40}$$

When p=7 and $d_m$=1 are given, the encryption device of the embodiment disperses and embeds a plaintext $(3,0,1,1,5)_{(7)}$ as factors of a plaintext polynomial. For example, when $D_m$=3, the plaintext $(3,0,1,1,5)_{(7)}$ may be dispersed to result in $m_1=(2,5,5,2,3)_{(7)}$, $m_2=(6,6,5,1,2)_{(7)}$, and $m_3=(2,3,5,5,0)_{(7)}$. The plaintext is restored by obtaining the sum $m_1+m_2+m_3=(3,0,1,1,5)_{(7)}$ for each of these vector elements.

When dispersing a plaintext into a sum of a plurality of elements, for example, when dispersing a plaintext M to $m_1, \ldots, m_{Dm}$, the encryption device of the embodiment generates random data by using $m_1, \ldots, m_{Dm-1}$, with the same size as the plaintext M, and derives $m_{Dm}=m-(m_1+m_2+\ldots+m_{Dm-1})$.

Encryption Algorithm

1. The plaintext is dispersed and embedded to the factors $m_j(x,y)$ (j=1, \ldots, $D_m$) of the plaintext polynomial with the degree $d_m$ in the manner described above. When the plaintext $(3,0,1,1,5)_{(7)}$ is dispersed to result in $m_1=(2,5,5,2,3)_{(7)}$, $m_2=(6,6,5,1,2)_{(7)}$, and $m_3=(2,3,5,5,0)_{(7)}$ as follows.

$$m_1(x,y)=(2t+1)x+(5t+5)y+2t+3$$

$$m_2(x,y)=(6t+1)x+(6t+5)y+t+2$$

$$m_3(x,y)=(2t+1)x+(3t+5)y+5t$$

Here, the coefficient of the term x is fixed to 1 in to remove ambiguity of a constant multiple of the plaintext polynomial factor, and the plaintext is not embedded in the coefficient of the term x.

2. Generation of random polynomial $r_k(x,y)$ (k=1, 2)

A bivariate random polynomial $r_k(x,y)$ with the degree $D_r$ having a coefficient of degree $d_r$ or lower is randomly generated from the term sets $\Gamma_{Dr,dr}$. The specific generation method is as follows.

(a) $r_k(x,y)=0$ (initial value 0 is substituted to $r_k$)
(b) The following is executed for each $(i,j) \in \Gamma_{Dr}$.
  i. Uniformly and randomly generate a polynomial $r_{ij}(t)$ with the degree $d_r$ from $F_p[t]$.
  ii. $r_k = r_k + r_{ij}(t)x^i y^j$ (substitute the expression on the right side into $r_k$)
  Example: When p=7, $D_r$=2, and $d_r$=1, the random polynomial $r_k$ generated is expressed by the following Formula (41) for example.

$$r_1=(3t+4)x^2+(t+3)xy+(5t+2)y^2+(2t+4)x+(2t+1)y+6t+2$$

$$r_2=(6t+6)x^2+(t+1)xy+(t+3)y^2+(4t+2)x+(4t+5)y+t \tag{41}$$

3. Generation of random polynomial $s_k(x,y)$

A bivariate random polynomial $s_k(x,y)$ with the degree $D_s$ having a coefficient of degree $d_s$ or lower is randomly generated from the term sets $\Gamma_{Ds,ds}$. The specific generation method is as follows.

(a) $s_k(x,y)=0$ (initial value 0 is substituted to $s_k$)
(b) The following is executed for each $(i,j) \in \Gamma_{Ds}$.
  i. Uniformly and randomly generate a polynomial $s_{ij}(t)$ with the degree $d_s$ from $F_p[t]$.
  ii. $s_k = s_k + s_{ij}(t)x^i y^j$ (substitute the expression on the right side into $s_k$)
  Example: When p=7, $D_s$=1, and $d_s$=1, the random polynomial $s_k$ generated is expressed by the following Formula (42), for example.

$$s_1=(6t+4)x+(4t+5)y+t+6$$

$$s_2=(t+5)x+(6t+6)y+2t+2 \tag{42}$$

4. Generation of noise polynomial $e_k(x,y)$

A noise polynomial $e_k(x,y)$ with coefficients of degree $d_e$ or lower is generated from the noise polynomial form $\Gamma_{De,de}$. The specific generation method is as follows.

(a) $e_k(x,y)=0$ (initial value 0 is substituted to $e_k$)
(b) The following is executed for each $(i,j) \in \Gamma_{De}$.
  i. Uniformly and randomly generate a polynomial $e_{ij}(t)$ with the degree $d_e$ from $F_p[t]$.
  ii. $e_k = e_k + e_{ij}(t)x^i y^j$ (substitute the expression on the right side into $e_k$)
  Example: When p=7, $D_e$=0, and $d_e$=3, the noise polynomial $e_k$ generated is expressed by the following Formula (43), for example.

$$e_1=6t^3+3t^2+4t$$

$$e_2=t^3+4t^2+3t+2 \tag{43}$$

5. Generation of ciphertext $c_k(x,y)$

A ciphertext $c(x,y)=E_{pk}(M,s_i,r_i,e_i,X)$ is calculated with the following Formula (44).

$$c_k(x, y) = \prod_{j=1}^{D_m} m_j(x, y) s_k(x, y) + X(x, y) r_k(x, y) + e_k(x, y) \quad (k = 1, 2) \tag{44}$$

(Example) In this example, the ciphertext $c_1$ is expressed by the following Formula (45), and the ciphertext $c_2$ is expressed by the following Formula (46).

$$c_1=(3t^9+3t^8+4t^7+3t^5+6t^4+3t^3+6t^2+6t+3)x^4+(2t^9+2t^8+4t^6+2t^5+t^4+4t^3+4t^2+6t+1)x^3 y+(3t^8+6t^7+6t^6+5t^5+6t^3+5t^2+t+5)x^2 y^2+(3t^9+5t^8+6t^7+t^5+6t^4+2t^3+5t^2+4t+3)x y^3+(2t^8+t^7+2t^6+3t^5+6t^3+2t^2+2t)y^4+(t^9+4t^8+5t^7+2t^5+5t^4+t^3++2t+1)x^3+(2t^9+2t^8+2t^6+3t^4+t^3+t^2t+4)x^2 y+(6t^8+4t^7+5t^5+3t^5+6t^4+5t^3+5t+6)x y^2+(6t^9+5t^8+6t^7+5t^6+4t^5+3t^4+4t^3+6t^2+4t+1) y^3+(2t^9+6t^8+2t^7+3t^6+t^5+t^4+2t^3+2t^2+6t+6)x^2+(6t^8+6t^7+5t^6+2t^5+3t^4+2t^3+6t^2+2t+6)x y+(3t^9+3t^8+2t^7+4t^6+t^5+t^4+t^3+4t^2+2t+2) y^2+(2t^9+3t^8+5t^7+4t^6+3t^5+3t^4+5t^3+4t^2+4)x+(t^9+3t^8+4t^7+4t^5+2t^4+3t+6) y+5t^8+3t^7 t^6+6t^5+4t^4+2t^3+6t^2+4t+4 \tag{45}$$

$$c_2=(6t^9+4t^8+4t^7+5t^6+4t^5+3t^4+4t^3+2t^2+2t)x^4+(3t^9+t^8+2t^7+t^6+3t^5+6t^4+3t^3+5t^2+6)x^3 y+(2t^8+2t^6+t^5+2t^4+3t^3+3t^2+2t+1)x^2 y^2+(4t^9+3t^8+3t^7+5t^6+5t^5+4t^4+2t^3+3t^2+5t+5)x y^3+(6t^9+3t^8+6t^7+6t^6+4t^4+4t^2+6t+5) y^4+(2t^9+5t^8+6t^7+3t^6+4t^5+6t^4+t^3+2t^2+6t+1)x^3+(2t^9+5t^7+3t^6+5t^5+6t^4+5t^3+5t^2+4t+3)x^2 y+(4t^8+t^7+t^6+3t^5+3t^4+4t^3+4t^2+t+2)x y^2+(6t^9+6t^8+t^7+3t^5+6t^4+5t^2+3t+3) y^3+(5t^8+t^7+t^6+4t^5+6t^4+3t^3+4t+5)x^2+(6t^9+6t^8+5t^7+5t^6+5t^5+4t^3+t^3+5t^2+5t+6)x y+(6t^9+6t^8+4t^7+4t^6+4t^4+5t^3+5t^2+4t+3) y^2+(3t^9+2t^8+6t^7+t^6+5t^5+6t^4+4t^3+4t^2+4t+2)x+(4t^9+4t^8+5t^7+2t^6+5t^5+4t^4+5t^3+3t^2+t) y+2t^9+4t^8+5t^7+2t^6+5t^5+t^4+5t^3+3t^2+2t+2 \tag{46}$$

Decryption (No. 1)

Next, first decryption processing of the embodiment will be described.

It is to be noted that substitution $u:(x,y):=(u_x(t),u_y(t))$ into the indeterminate equation $X(x,y)$ results in $X(u_x(t),u_y(t))=0$.

Decryption Algorithm

The decryption algorithm is as follows.
1. Substitution of Solution

The following Formulation (47) is calculated with the solution u substituted into $c_k(x,y)$.

$$c_k(u_x(t), u_y(t)) = \prod_{j=1}^{D_m} m_j(u_x(t), u_y(t)) s_k(u_x(t), u_y(t)) + e_k(u_x(t), u_y(t)) \quad (47)$$

In the present example, $c_1(u_x(t),u_y(t))$ is expressed by the following Formula (48), and $c_2(u_x(t),u_y(t))$ is expressed by the following Formula (49).

$$c_1(u_k(t),u_y(t))=3t^{39}+t^{38}+3t^{37}+2t^{36}+5t^{35}+3t^{34}+2t^{33}+\\5t^{32}+t^{31}+4t^{29}+5t^{28}+4t^{27}+6t^{25}+5t^{24}+3t^{23}+5t^{22}+\\5t^{19}+t^{18}+3t^{17}+2t^{16}+5t^{15}+3t^{14}+t^{12}+t^{11}+6t^{10}+6t^9+\\6t^8+5t^7+3t^6+5t^4+4t^3+3t^2+5t \quad (48)$$

$$c_2(u_k(t),u_y(t))=t^{40}+2t^{39}+t^{38}+4t^{37}+6t^{35}+2t^{34}+4t^{32}+\\5t^{31}+t^{30}+5t^{29}+3t^{28}+6t^{25}+2t^{24}+3t^{23}+6t^{22}+5t^{21}+\\2t^{20}+2t^{18}+6t^{17}+3t^{16}+t^{15}+5t^{14}+2t^{13}+t^{12}+3t^{11}+\\3t^{10}+2t^9+3t^8+6t^7+3t^6+3t^5+5t^3+3t \quad (49)$$

2. Calculate product $M(u_x(t),u_y(t)) (=\Pi_{i=1}^{D_m} m_i(u_x(t),u_y(t)))$ of plaintext polynomial by approximate GCD calculation This holds when the condition of Formula (13) described above is satisfied, and the condition of Formula (13) is guaranteed based on a condition (62) described later. This expressed by the following Formula (50) in this example.

$$m(u_x(t),u_y(t))=t^{30}+6t^{29}+3t^{28}+5t^{27}+3t^{26}+2t^{25}+3t^{24}+\\5t^{23}+2t^{22}+4t^{21}+2t^{20}+3t^{19}+6t^{18}+6t^{17}+2t^{16}+6t^{14}+\\t^{12}+3t^{12}+t^{11}+5t^{10}+t^9+6t^8+t^7+3t^6+t^5+t^4+5t^3+6t^2+\\5t+2 \quad (50)$$

3. Factorization of $M(u_x(t),u_y(t))$

In the case of this example, decompression as in the following Formula (51) is implemented.

$$(t+2)(t+3)(t^2+t+4)(t^8+5t^6+3t^5+t^4+6t^3+4t^2+t+1)(t^8+3t^7+\\6t^6+6t^5+4t^4+t^3+4t^2+6t+5)(t^{10}+4t^9+4t^7+2t^6+5t^4+\\5t^3+5t^2+t+2) \quad (51)$$

4. The plaintext polynomials are restored from combinations of factors obtained in Step 3

In this example, $(2t+1)x+(5t+5)y+2t+3$ can be restored from the factors $(t+2)(t+3)(t^8+5t^6+3t^5+t^4+6t^3+4t^2+t+1)$. Furthermore, $(5t+1)x+(4t+4)y+5t+3$ can be restored from the factors $(t^2+t+4)(t^8+3t^7+6t^6+6t^5+4t^4+t^3+4t^2+6t+5)$. Furthermore, $(2t+1)x+(3t+5)y+5t$ is restored from the factor $(t^{10}+4t^9+4t^7+2t^6+5t^4+5t^3+5t^2+t+2)$. Details of the method of determining the combinations of the factors and the restoration of the plaintext polynomial factor will be described later in "Narrowing down plaintext polynomial factor" and "Restoration of plaintext polynomial factor",

Restoration of Plaintext Polynomial Factor

Next, a method for restoring the plaintext polynomial factor $m_i(x,y)$ from combinations of factors obtained in Step 4 of the decryption algorithm will be described. Here, for the sake of description, an algorithm for restoring the factor $m(x,y)$ of the plaintext polynomial from $m(u_x(t),u_y(t))$ without subscripts will be described.

First of all, when a correct factor $m(u_x(t),u_y(t))$ (that is, one corresponding to the correct plaintext polynomial $m(x, y)$) is obtained, the plaintext polynomial is given with the following Formula (52).

$$m(x, y)=m_x(t)x+m_y(t)y+m_1(t) \quad (52)$$

Here, since $\deg m_x(t), \deg m_y(t), \deg m_1(t) \leq d_m$ holds, $m(x, y)$ can be further expressed as in the following Formula (53).

$$m(x, y) = \left(\sum_{j=0}^{d_m} m_{x,j} t^j\right) x + \left(\sum_{j=0}^{d_m} m_{y,j} t^j\right) y + \sum_{j=0}^{d_m} m_{1,j} t^j \quad (53)$$

Then, a formula obtained by substitution with the private key $(x,y)=(u_x(t),u_y(t))$ is substituted with $m_{x,j}$, $m_{y,j}$ ($j=0, \ldots, d_m$) serving as variables is compared with $m(u_x(t),u_y(t))$ (the following Formula (54)).

$$m(u_x(t), u_y(t)) = \left(\sum_{j=0}^{d_m} m_{x,j} t^j\right) u_x(t) + \left(\sum_{j=0}^{d_m} m_{y,j} t^j\right) u_y(t) + \sum_{j=0}^{d_m} m_{1,j} t^j \quad (54)$$

As described above, Formula (54) has the variable on the right side only and has no variable on the left side, whereby simultaneous equations are obtained through coefficient comparison between the right and left sides. Moreover, since the variables on the right side are not multiplied by each other, simultaneous linear equations are obtained. The plaintext polynomial can be restored by solving them.

Note that the equation derived from the above Formula (54) has a variable $3(d_m+1)$. The equation comprises a plaintext polynomial in a form of Formula (52) described above. Considering that the overall degree is $d+d_m$, the number of terms including the constant term is $d+d_m+1$, and thus the same number of equations are obtained.

Considering the fact that the number of equations needs to be equal to or larger than the number of variables, the condition of the following Formula (55) needs to be satisfied to obtain a single solution.

$$d \geq 2(d_m+1) \quad (55)$$

The example in the above "Decryption algorithm", where $d=9$ and $d_m=1$ ($d+d_m=10$), satisfies this condition. Here, a failure to obtain such a solution indicates that the target factor $m_j(u_x(t),u_y(t))$ is incorrect, so that the factor is discarded.

Narrowing Down Plaintext Polynomial Factors

Next, based on the example of the embodiment, a detailed description will be given on a method of extracting candidates of the factor $m(u_x(t),u_y(t))$ corresponding to the plaintext polynomial factor from factors obtained by factorizing $M(u_x(t),u_y(t))$ and narrowing down the candidates.

To begin with, the degree of $m(u_x(t),u_y(t))$ is $d+d_m$, and $d=9$ and $d_m=1$ hold in this example, so that 10th degree is derived. When this is compared with the factorization expressed by the above Formula (51), one factor expressed by the following Formula (56) is determined.

$$(t^{10}+4t^9+4t^7+2t^6+5t^4+5t^3+5t^2+t+2) \quad (56)$$

The other two factors are either a pair expressed by the following Formula (57) or a pair expressed by the following Formula (58).

$$(t+2)(t+3)(t^8+5t^6+3t^5+t^4+6t^3+4t^2+t+1),(t^2+t+4)(t^8+ \\ 3t^7+6t^6+6t^5+4t^4+t^3+4t^2+6t+5) \quad (57)$$

$$(t+2)(t+3)(t^8+3t^7+6t^6+6t^5+4t^4+t^3+4t^2+6t+5),(t^2+t+4) \\ (t^8+5t^6+3t^5+t^4+6t^3+4t^2+t+1) \quad (58)$$

In fact, when the plaintext is restored for the former, the following Formula (59) can be restored. On the other hand, the latter is rejected because no equation solution is derived from the above Formula (54).

$$(2t+1)x+(5t+5)\,\mathcal{Y}+2t+3,5t+1)x+(4t+4)\,\mathcal{Y}+5t+3 \quad (59)$$

In this example, a relatively simple combination is obtained because the degrees of the factors of $m(u_x(t),u_y(t))$ are each (1,1,2,8,8,10). When the degree of the factors is (1,1,2,2,2,2,4,6,10) for example, more complex combination is obtained. In such a case, an algorithm for solving a subset sum problem is used (but will not be described in detail herein). The subset sum problem is solved to obtain a partial sequence with which a certain number N is obtained by selecting from and adding up some elements in a sequence of natural numbers $a_1, a_2, \ldots, a_l$ with the length l. In this example, N is 10, and the solution of the problem is to obtain a partial sequence with the sum being 10 with no overlapping.

Here, there are factors corresponding to the respective numbers in the sequence (1,1,2,2,2,2,4,6,10), and thus to distinguish them, the elements are numbered to be [1,2,3,4,5,6,7,8,9]. For example, [1,2,3,4,5,6] corresponds to a sequence (1,1,2,2,2,2) a sum of which is 10. Furthermore, [7,8] and [9] also results in the sum of 10. A combination of these is one candidate. Furthermore, there is a combination of [1,2,3,4,7] paired with [5,6,8], [9] corresponding to this. The subset sum problem is generally an NP-hard problem. Still, it has been known that problems of such a small size can be solved in a relatively short period of time.

Parameter Requirements for Achieving Both Decryption and Security

In the decryption (No. 1), to satisfy the condition (13) for enabling the approximate GCD calculation executed in Step 2, the conditions of the following Formulae (60) and (61) need to be satisfied.

$$\deg \prod_{j=0}^{D_m} m_j(u_x(t), u_y(t)) \geq 2 \deg s_i(u_x(t), u_y(t)) \quad (60)$$

$$\deg s_i(u_x(t), u_y(t)) > \deg e_i(u_x(t), u_y(t)) \quad (61)$$

The conditions of the above Formulae (60) and (61) are expressed by following Formula (62) using the system parameters described above.

$$D_m(d+d_m) \geq 2(D_s d+d_s)$$

$$D_s d+d_s > D_e d+d_e \quad (62)$$

The above conditions (27) and (28) for guaranteeing security and the above condition (55) for plainext and random element restoration are added to the condition of the above Formula (62), resulting in the resultant parameter condition expressed by the following Formula (63).

$$D_m+D_s=D_X+D_r$$

$$D_m d_m+D_s d_s=D_X d_X+D_r d_r$$

$$D_m(d+d_m) \geq 2(D_s d+d_s)$$

$$D_s d+d_s > D_e d+d_e$$

$$d \geq 2(d_m+1) \quad (63)$$

Decryption (No. 2)

Next, second decryption processing of the embodiment will be described. In the above-described decryption (No. 1), $\Pi_{j=1}^{D_m} m_y(u_x(t),u_y(t))$ is obtained by approximate GCD calculation with two Formulae obtained by substituting the solution $(u_x(t),u_y(t))$, serving as the private key, into the ciphertext $(c_1,c_2)$. Furthermore, by factorizing this, an individual factor $m_y(u_x(t),u_y(t))$ is obtained, and the corresponding factor $m_j(x,y)$ is restored. However, with this method, a condition of $d \geq (d_m+1)$ must be satisfied for the restoration, meaning that and if d is fixed, dm is limited, and the degree of the coefficient of each $m_j(x,y)$ needs to be reduced.

In view of this, as the decryption (No. 2), a method not using $m_j(u_x(t),u_y(t))$ for restoring $m_j(x,y)$ will be described. This method is free of limitation according to the condition (55) described above, whereby parameters such as d=3 and $d_m=1$ can also be used for example. Also in such a case, the public key and the private key can be generated with a method that is the same as the one described above.

Hereinafter, the public key $X(x,y)$ and the private key $(u_x(t),u_y(t))$ generated based on this parameter will be described as an example.

Example: When p=7, d=3, and $D_x=2$, $X(x,y)$ is expressed by the following Formula (64).

$$(u_y(t),u_x(t))=(4t^3+2t+6,2t^3+4t^2+6t+2)$$

$$X(x,\mathcal{Y})=(3t^2+t+4)x^2+(3t^2+t+5)x\,\mathcal{Y}+(3t^2+5t+6)\,\mathcal{Y}^2+ \\ (5t^2+6t+3)x+(2t^2+6t+6)\,\mathcal{Y}+5t^2+4t+1 \quad (64)$$

Further, based on this public key, the plaintext M=(2,2,2,3,3)$_{(7)}$ is dispersed to $(6,5,6,1,3)_{(7)}+(3,4,3,2,0)_{(7)}$, and is embedded in the plaintext polynomial factors $m_1(x,y)$ and $m_2(x,y)$ as in the following Formula (65).

$$\begin{cases} m_1(x,y) = (2t+6)x + (5t+6)y + t + 3 \\ m_2(x,y) = (2t+3)x + (4t+3)y + 2t \end{cases} \quad (65)$$

Here, the coefficient of the term tx needs to be fixed to 2 in order to remove ambiguity of a constant multiple of the plaintext polynomial factor, and thus the plaintext is not embedded. The ciphertext $(c_1,c_2)$ for the plaintext polynomial factor can be generated as in the following Formula (67) with the random polynomial of the following Formula (66) used and a noise polynomial set to $e_1=t+1$ and $e_2=3t+6$.

$$\begin{cases} r_1 = (6t+3)x + (6t+6)y + 6t+5 \\ r_2 = (t+1)x + 6ty + 4t+2 \\ s_1 = (2t+3)x + (5t+2)y + 3t+5 \\ s_2 = (2t+6)x + (4t+6)y + t+2 \end{cases} \quad (66)$$

$$\begin{cases} c_1 = (5t^3+5t+3)x^3 + (t^3+4t^2+5t+1)x^2y + (5t^3+4t^2+2t+6)xy^2 + \\ \quad (6t^3+3t^2+3t+2)y^3 + (2t^3+3t^2+3t+6)x^2 + (4t^3+t^2+t+6)xy + \\ \quad (6t^3+4t^2+5t+6)y^2 + (5t^3+t^2+6t)x + (2t^3+5t^2+4t+4)y + t^3+t+6 \\ c_2 = (4t^3+t^2+2t)x^3 + (3t^3+6t^2+t)x^2y + (2t^3+6t+1)xy^2 + \\ \quad (5t^2+6t+3)y^3 + (5t^3+6t^2+t+3)x^2 + (2t^3+6t^2+5t)xy + \\ \quad (2t^3+4t^2+4)y^2 + (2t^2+4t+4)x + (4t^3+3t^2+t+2)y + t^3+t^2+6t+1 \end{cases} \quad (67)$$

Decryption Algorithm

A decryption algorithm of decryption (No. 2) is as follows.

1. Substitution of Solution

The following Formulation (68) is calculated with the solution u substituted into $c_k(x,y)$.

$$c_k(u_x(t), u_y(t)) = \prod_{j=1}^{D_m} m_j(u_x(t), u_y(t)) s_k(u_x(t), u_y(t)) + e_k(u_x(t), u_y(t)) \quad (68)$$

In this example, this results in the following Formula (69).

$$c_1(u_x(t), u_y(t)) = 4t^{12} + 6t^{11} + t^{10} + 5t^9 + 6t^8 + 6t^7 + 6t^6 + 3t^5 + t^3 + 5t^2 + t + 5 \quad (69)$$

$$c_2(u_x(t), u_y(t)) = 2t^{12} + 2t^{11} + 4t^{10} + 5t^7 + 2t^6 + t^5 + 6t^2 + t + 5 \quad (69)$$

2. Calculation of Product $M(u_x(t),u_y(t))(=\prod_{i=1}^{D_m} m_i(u_x(t),u_y(t)))$ of Plaintext Polynomial by Approximate GCD Calculation This holds when the condition of Formula (13) described above is satisfied, and the condition of Formula (13) is guaranteed based on a condition (62) described above. In this example, $M(u_x(t),u_y(t))$ is expressed by the following Formula (70).

$$M(u_x(t), u_y(t)) = t^8 + 3t^7 + 3t^6 + 2t^5 + 4t^4 + 4t^3 + 6t^2 + 4t + 6 \quad (70)$$

3. Calculation of $e_k(u_x(t),u_y(t))$ to Restore $e_k(x,y)$

From $M(u_x(t),u_y(t))$ calculated in Step 2, $e_k(u_x(t),u_y(t))$ is calculated by the following Formula (71), and $e_k(x,y)$ is restored by the restoration method described in the above decryption (No. 1).

$$e_k(u_x(t), u_y(t)) = c_k(u_x(t), u_y(t)) \bmod M(u_x(t), u_y(t)) \quad (71)$$

In the case of this example, $D_e(=\deg_{x,y} e(x,y))=0$ holds, and thus the following Formula (72) corresponds to each of $e_1(x,y)$ and $e_2(x,y)$.

$$e_1(u_x(t), u_y(t)) = t+1$$

$$e_2(u_x(t), u_y(t)) = 3t+6 \quad (72)$$

Even when $D_e > 0$ holds, restoration can be implemented if the condition $d \geq 2(d_e+1)$ is satisfied.

4. Derivation of $\prod_{j=2}^{D_m} m_j s_k + X r_k$

This is derived by calculating $c_k - e_k$. In this example, the following Formulae (73) and (74) are used for this.

$$c_1 - e_1 = \prod_{j=1}^{D_m} m_j \cdot s_1 + X r_1 = (5t^2+5t+3)x^3 + (t^3+4t^2+5t+1)x^2 y + (5t^3+4t^2+2t+6)xy^2 + (6t^3+3t^2+3t+2)y^3 + (2t^3+3t^2+3t+6)x^2 + (4t^3+t^2+t+6)xy + (6t^3+4t^2+5t+6)y^2 + (5t^3+t^2+6t)x + (3t^3+5t^2+4t+4)y + t^3 + 5 \quad (73)$$

$$c_2 - c_2 = \prod_{j=1}^{D_m} m_j \cdot s_2 + X r_2 = (4t^2+t^2+2t)x^3 + (3t^3 + 6t^2+t)x^2 y + (2t^2+6t+1)x y^2 + (5t^2+6t+3)y^3 + (5t^3+6t^2+t+3)x^2 + (2t^3+6t^2+5t)xy + (2t^3+4t^2+4)y^2 + (2t^2+4t+4)x + (4t^3+3t^2+t+2)y + t^3 + t^1 + 3t + 2 \quad (74)$$

5. Ideal Decomposition of $c_k - e_k$ to Derive $m_j$ and $s_k$

Details of the method for the ideal decomposition are as in the ideal decomposition described above. In this example, $c_1 - e_1$ is decomposed into the following Formula (75), and $c_2 - e_2$ is decomposed into the following Formula (76).

$$(2t+6)x + (5t+6)y + t+3, (2t+3)x + (4t+3)y + 2t, (2t+3)x + (5t+2)y + 3t + 5 \quad (75)$$

$$(2t+6)x + (5t+6)y + t+3, (2t+3)x + (4t+3)y + 2t, (2t+6)x + (4t+6)y + t+2 \quad (76)$$

The common part of these are $m_1(x,y)$ and $m_2(x,y)$ as in the following Formula (77), and match those generated in the above Formula (65).

$$(2t+6)x + (5t+6)y + t+3, (2t+3)x + (4t+3)y + 2t \quad (77)$$

Furthermore, $s_1(x,y)$ and $s_2(x,y)$ are respectively obtained by $(2t+3)x + (5t+2)y + 3t+5$ and $(2t+6)x + (4t+6)y + t+2$ other than the common part, and are also consistent with the above-described Formula (66). With the ideal decomposition, there may be a plurality of decomposition candidates. Still, almost all these candidates other than a plaintext polynomial can be discarded in Step 6.

6. Restoration of $r_k$ $r_k$ is restored with $r_k = (c_k - e_k - \prod_{j=1}^{D_m} m_j \cdot s_k)/X$.

7. Restoration of Plaintext M

When $m_j$, $s_k$, $r_k$, and $e_k$ are all restored, $M(x,y)$ is restored from the plaintext polynomial factor $m_j(x,y)$ using the above-described Formula (21), and the plaintext M is restored from the coefficients thereof. When $m_j$, $s_k$, $r_k$, and $e_k$ are all restored, the plaintext M is restored from the plaintext polynomial factor.

Parameter Requirements for Achieving Both Decryption and Security

The decryption (No. 2) also requires satisfaction of the condition (62) for enabling the approximate GCD calculation executed in Step 2, but the condition (55) for restoring the polynomial changes to a condition $d \geq 2(d_e+1)$ for noise polynomial restoration. When this and a condition for guaranteeing security are combined, the following Formula (78) is obtained as a condition for achieving both decryption and security.

$$D_m + D_s = D_X + D_r$$

$$D_m d_m + D_s d_s = D_X d_X + D_r d_r$$

$$D_m(d+d_m) \geq 2(D_s d + d_s)$$

$$D_s d + d_s > D_e d + d_e$$

$$d \geq 2(d_e+1)$$

When $D_e = 0$, the condition $d \geq 2(d_{e+}1)$ is eliminated, and the following Formula (79) is obtained.

$$D_m + D_s = D_X + D_r$$

$$D_m d_m + D_s d_s = D_X d_X + D_r d_r$$

$$D_m(d+d_m) \geq 2(D_s d + d_s)$$

$$D_s d + d_s > d_e$$

Notes on Decryption

Decryption (No. 1) and decryption (No. 2) both use approximate GCD calculation. The condition (62) for enabling the calculation is reflected in each of the parameter conditions (63) and (78).

Unfortunately, in actual decryption, $\deg \Pi_{j=1}^{D_m} m_j(u_x(t),u_y(t))$ or $\deg s_i(u_x(t),u_y(t))$ might be reduced (due to the coefficient of the highest degree being 0 during the calculation), and as a result, any one of two inequalities (60) and (61), on which the condition (62) is based, might fail to be established, and thus the approximate GCD calculation might fail. In view of this, the probability of the approximate GCD calculation failing needs to be set to a certain value or less, and the degree of the GCD input to the approximate GCD calculation needs to start from $\deg \Pi_{j=1}^{D_m} m_j(u_x(t),u_y(t))$. On the other hand, when $\gcd(s_1(u_x(t),u_y(t)), s_2(u_x(t),u_y(t))) \neq 1$, since $s_1(u_x(t),u_y(t))$ and $s_2(u_x(t),u_y(t))$ are not coprime, a common factor $v(t)$ exists, and GCD is $v(t)\Pi_{j=1}^{D_m} m_j(u_x(t), u_y(t))$. Therefore, it is necessary to set the degree of GCD to a point slightly higher than $\deg \Pi_{j=1}^{D_m} m_j(u_x(t),u_y(t))$.

Decryption Failure Probability

Next, on the assumption that the distributions of the coefficients of each of $\deg \Pi_{j=1}^{D_m} m_j(u_x(t),u_y(t))$ and $\deg s_i(u_x(t),u_y(t))$ are independent uniform distribution, the probability that the conditions (60) and (61) fail to be satisfied is obtained.

The following Formula (80) indicates a probability $\text{Prob}_{mfail}$ that the inequality (60) does not hold. The following Formula (81) indicates a probability $\text{Prob}_{mfail}$ that the inequality (61) does not hold. The larger one of probabilities indicated by the following Formulae (80) and (81) is the decryption failure probability.

$$\text{Prob}_{mfail} = p^{2(D_s d + d_s) - D_m(d+d_m)} \tag{80}$$

$$\text{Prob}_{sfail} = p^{(D_e d + d_e) - (D_s d + d_s) - 1} \tag{81}$$

In the following, some variations (modified examples) of the present embodiment will be described.

Variations of Ciphertext

While the ciphertext of the present embodiment is defined by Formula (44), the encryption method and the decryption method of the embodiment, as well as the security verification described later can be similarly implemented, with the ciphertext defined with the following Formula (82).

$$c_k(x,y) = \prod_{j=1}^{D_m} m_j(x,y) s_k(x,y) \pm X(x,y) r_k(x,y) \pm e_k(x,y) (k=1,2) \tag{82}$$

Variations Related to Compression of Public Key X(x,y)

In the above-described embodiment, coefficients of the indeterminate equation X(x,y), serving as a public key, are uniformly and randomly obtained except for constant term, and only some of the terms (in the above embodiment, term $x'(i=0, \ldots, D_x)$) are adjusted. Although the information of the private key is required for the adjustment, the term that is not adjusted remains to be random. Therefore, if the seed used for the generation is disclosed, the terms can be generated with a specific pseudo random number generation function, a hash function, or the like designated. Therefore, only coefficients of the seed and the adjusted part need to be disclosed, and the size of the public key is compressed. In this manner, in the above embodiment, only part of the following Formula (83) is disclosed as the actual coefficient, and the other terms can be compressed to approximately ½ with degree 2, to approximately ⅖ with degree 3, and to approximately ⅓ with degree 4, by disclosing the seed (which usually has the bit length of the security parameter only).

$$X(x,y) = (t^8 + 2t^7 + t^6 + t^5 + 2t^4 + 5t^3 + 6t^2 + 2t + 5)x^2 + (2t^8 + 3t^7 + 6t^6 + 4t^5 + 2t^4 + 5t^3 + 4t^2 + 6t + 1)x + 2t^8 + 4t^7 + 5t^6 + 2t^5 + 5t^4 + 2t^3 + 5t^2 + 2t + 2 \tag{83}$$

This variation enables expansion of application to cover to low-end devices with a small memory capacity.

Variations Related to Coefficient of Public Key X(x,y)

In the present embodiment, coefficients of the indeterminate equation X(x,y) serving as a public key are uniformly and randomly obtained except for constant term, and only part of the terms (in the above embodiment, term $x'(i=0, \ldots, D_x)$) is adjusted. Here, each coefficient is an element of $F_p[t]$, and not all the coefficients are necessarily non-zero coefficient. If there is a non-zero coefficient, there is a possibility that the coefficients of some terms are always zero in $X(x,y) r_k(x,y)$ of the ciphertext. In that case, there part of the information of the random polynomial constituting the ciphertext might leak (while not all the information may leak), and part of the information of the plaintext might leak therefrom, due to a linear algebra attack or a coefficient comparison attack. In view of this, in this variation, a method of making the coefficient of the coefficient $\tau_{ij}(t)$ of each term of the public key X(x,y) non-zero will be described.

In order to realize this, first of all, a range for uniformly and randomly obtaining the coefficient $\tau_{ij}(t)$ is set as a range from 1 to p. As for the coefficients to be further adjusted, when some of the coefficients become zero as a result of the adjustment, the coefficients can be non-zero with the private key $u_x(t), u_y(t)$ reset, or the seed used for uniform random selection changed and reset.

Variations Regarding how to Term Set is Set

In the above-described embodiment, the term set is limited to the maximum term set for the sake of simplicity. This sufficiently works for effectively hiding the plaintext using the polynomial having the unknown coefficient, but may not be because it requires a condition that the plaintext term $\Pi_{j=1}^{Dm} m_j(x,y) s_k(x,y)$ in the ciphertext $c_k(x,y)$ and the public key term $X(x,y) r(x,y)$ to be of the same type of formula, and thus might not quite be an essential feature. Thus, to specify the type of these formulae, $\Delta_\xi$ can be designated instead of the parameters $D_\xi$ and $d_\xi$ (where, s, r, e, and X are included in $\xi$). With this setting, a term set smaller than the maximum term set can be obtained, whereby the public key, the ciphertext, and the like can be downsized.

Variations for Obtaining $s_k$, $r_k$, and $e_k$ in Decryption (No. 1)

In the decryption (No. 1), $s_k$, $r_k$, and $e_k$ are not obtained as in the decryption (No. 2). Still, $s_k$ and $e_k$ can be restored using the method that is the same as that for obtaining the plaintext polynomial factor $m_j$. Furthermore, the method for the decryption (No. 2) can be used for $r_k$. However, in this case, a condition of the following Formula (84) is required in addition to the condition (63) for restoring the former.

$d \geq 2(d_e+1)$ $d \geq 2(d_e+1)$

With this configuration, when there are plurality of decryption candidates, those candidates can be narrowed down as to whether or not the corresponding $s_k$, $r_k$, and $e_k$ are restorable. Thus, the decryption can be prevented from failing because there are plurality of candidates.

Variations of Embedding Plaintext Information Also in $s_k$, $r_k$, and $e_k$

When the variation of restoring $s_k, r_k, e_k$ described above is used, the plaintext information or part of the plaintext information can be embedded in these. As a result, a cryptographic method can be obtained that not only features a long bit length that can be encrypted at once, but also featuring resistance against an attack of falsifying the ciphertext, due to information serving as an authenticator added. Note that, in a case where the plaintext is embedded, including a case where it is embedded in a plaintext polynomial, an embedded area can be determined in advance. In this case, by embedding a random value or information decryption of which would no impose a huge impact in a non-plaintext embedded portion, consistency of the ciphertext can be maintained. Furthermore, the variation can be achieved with no plaintext embedded in a part where information leakage might occur, under a situation where the information partially leaks due to vulnerability caused by implementation of side channel attack, or the like.

Variation Without Dispersing Plaintext

In the present embodiment, since the plaintext term has the product structure, the order of the plaintext embedded by encryption is unrecognizable from the decryption result. The reason for dispersing the plaintext in the present embodiment is to improve security and to obtain a correct decryption result regardless of the order in which the plaintext is defined. Considering this, information indicating the order may be added to part of the plaintext polynomial factor. For example, when such information is added to the constant term of the plaintext polynomial factor shown in the above-described Formula (65), the following Formula (85) is obtained.

$$\begin{cases} m_1(x, y) = (2t + 6)x + (5t + 6)y + t \\ m_2(x, y) = (2t + 3)x + (4t + 3)y + 2t + 1 \end{cases} \quad (85)$$

In the above (85), the constant terms are 0 and 1 respectively indicating orders in which the plaintext is formed. In this example, $65613432_{(7)}$ is obtained based on the fact that the term of tx is fixed to 2 in order to address ambiguity of a constant multiple and the order of the plaintext of this example, resulting in a large size of plaintext that can be encrypted.

Note that numerical values indicating the order can be randomly arranged in a specific order and do not need to be provided as 0, 1, 2, ..., as long as the numerical values fall within the range of 0 to p−1. For example, in the case of p=7, the values may be 3 and 5. With such a configuration, a certain coefficient can be prevented from being fixed, encryption with high security can be provided without disclosing information effective for encryption analysis.

Variation Without Plaintext Polynomial Factor

In the present embodiment, the plaintext is dispersed and embedded in the plaintext polynomial factors. Alternatively, when decryption (No. 2) is performed, a similar configuration can be achieved with the following Formula (86) with the plaintext polynomial being n(x,y) instead of being based on the plaintext polynomial factor.

$$c_k(x, y) = m(x, y) s_k(x, y) \pm X(x, y) r_k(x, y) \pm e_k(x, y)$$
$$(k=1,2) \quad (86)$$

Here, since the approximate GCD calculation for $c_1(u_x(t), u_y(t))$ and $c_2(u_x(t), u_y(t))$ is performed, the condition (60) is required, meaning that the degree of m(x,y) is substantially 2 or more. This is difficult to decrypt with decryption (No. 1), but can be decomposed with ideal decomposition used in decryption (No. 2). With this configuration, since the number of factors involved in ideal decomposition for decryption is small, the processing speed can be increased.

Variation of Changing Degree of Approximate GCD in Approximate GCD Calculation

As described in "Notes on decryption" above, the degree $d_G$ of the approximate GCD to be an input in the approximate GCD calculation is $d_G = D_m(d+d_m)$ in most cases. Still, there are cases where the degree $d_G$ is smaller or larger than that. In the present variation, an embodiment taking this into consideration will be described. In order to implement this, in both the decryption (No. 1) and the decryption (No. 2), in the step of the approximate GCD calculation, the degree $d_G$ is set from a value smaller than $D_m(d+d_m)$ for the execution. Then, $d_G$ is gradually increased unless the plaintext is not restored. In the end, the $d_G$ is set to be a value exceeding $D_m(d+d_m)$ for the execution. In this way, it is possible to decrypt the ciphertext that has failed to be decrypted through execution with $d_G=D_m(d+d_m)$.

Variation Regarding Variables

Throughout the embodiment, the explanation has been given on the bivariate polynomial on $F_p[t]$. The encryption algorithm, the decryption algorithm, and the key generation algorithm as in the present embodiment can also be obtained with other general n variables. Even when the variables increase to be more than three, an indeterminate equation that solution problem for which is difficult to calculate is obtained as long as there is one indeterminate equation $X(x_1, \ldots, x_n)$. Generally, an increase in variables leads to a problem harder to solve, resulting in higher security. Thus, the increase enables the key size to be reduced, and also enables plaintext with a larger size to be embedded due to the large number of variables. Still, since there will be more coefficients to be restored, the system parameter needs to be changed to $d_s=n(d_m+1)$.

Variation of Changing Degree of Coefficient $e_{ij}(t)$ of Noise Polynomial for Each Term In the present embodiment, the description has been simplified with the limitation $D_e=0$. When restoring $e(x,y)$ with $D_e>0$ by decryption (No. 2), linear simultaneous equations are established based on the above-described Formula (54) from $e(u_x(t),u_y(t))$, and an algorithm for solving this is applied. In order to derive a unique solution in this case, the number of equations needs to be equal to or more than the number of variables. The number of equations matches the degree of the univariate polynomial $e(u_x(t),u_y(t))$. On the other hand, when $D_e=3$, the number of high-degree terms (terms with higher degree) of $e(x,y)$ is $x^3$, $x^2y$, $xy^2$, $y_3$, or the like, and thus is larger than the number of a lower degree terms. Therefore, by lowering the degree of the coefficient of the high-degree term and increasing the degree of the coefficient of the low-degree term in $e(x,y)$, the number of equations can be increased while suppressing the number of variables. Furthermore, with such a configuration, there is also an advantage that it is easier to satisfy the decryption condition (61) than in a case where $D_e$ is evenly fixed.

Variation of Introducing Product Structure into Coefficient $e(x,y)$ of Noise Polynomial In the present embodiment, the plaintext polynomial has a product structure, but the noise polynomial does not have a product structure. This is due to, for example, $D_e=0$. When $D_e>0$, it is necessary to establish linear simultaneous equations from $e(u_x(t),u_y(t))$ and solve the same in order to restore $e(x,y)$ as described in "Variation in changing degree of coefficient $e_{ij}(t)$ of noise polynomial for each term" described above. Here, when the product structure is introduced, the noise polynomial is a product of a plurality of noise polynomial factors, and the ciphertext is expressed by the following Formula (87).

$$c_k(x, y) = \prod_{j=1}^{D_m} m_j(x, y)s_k(x, y) + X(x, y)r_k(x, y) + \prod_{j=1}^{D_e} e_{k,j}(x, y)(k = 1, 2) \quad (87)$$

In the above equation (87), the noise polynomial factor $e_{kj}(x,y)$ is assumed to be a linear equation. For decryption, when a noise polynomial is restored with decryption (No. 2), $e(u_x(t),u_y(t))$ may be factorized and simultaneous equations may be provided for each factor as described in "Restoration of plaintext polynomial factor" described above. As a result, a noise polynomial having a univariate polynomial with a higher degree coefficient can be configured, leading to improvement of security.

Variations of Changing Roles of Noise Polynomial and Plaintext Polynomial

In the present embodiment, the plaintext is dispersed and embedded in the plaintext polynomial factor, but the roles of the plaintext polynomial and the noise polynomial can be changed based on the above-described "Variation of introducing product structure into coefficient $e(x,y)$ of noise polynomial". Specifically, the ciphertext is expressed by the following Formula (88).

$$c_k(x, y) = \prod_{j=1}^{D_e} e_j(x, y)s_k(x, y) + X(x, y)r_k(x, y) + \prod_{j=1}^{D_m} m_{k,j}(x, y)(k = 1, 2) \quad (88)$$

In this way, the plaintext M can be divided into $M_1$ and $M_2$, and can be embedded respectively in $m_1(x,y)=\prod_{j=1}^{D_m} m_{k,1}(x,y)$ and $m_2(x,y)=\prod_{j=1}^{D_m} m_{k,2}(x,y)$.

Part of or all the variations described above may be used in combination and applied to the embodiment. For example, "Variation of introducing product structure into coefficient $e(x,y)$ of noise polynomial" and "Variations of changing roles of the noise polynomial and the plaintext polynomial" may be combined. That is, the roles of the noise polynomial and the plaintext polynomial may be swapped, and the product structure may be introduced into the noise polynomial.

Specific Configurations

Next, specific configurations and operating methods of an encryption device, a decryption device, and a key generation device using public-key cryptography according to the present embodiment will be described.

Figure 5:
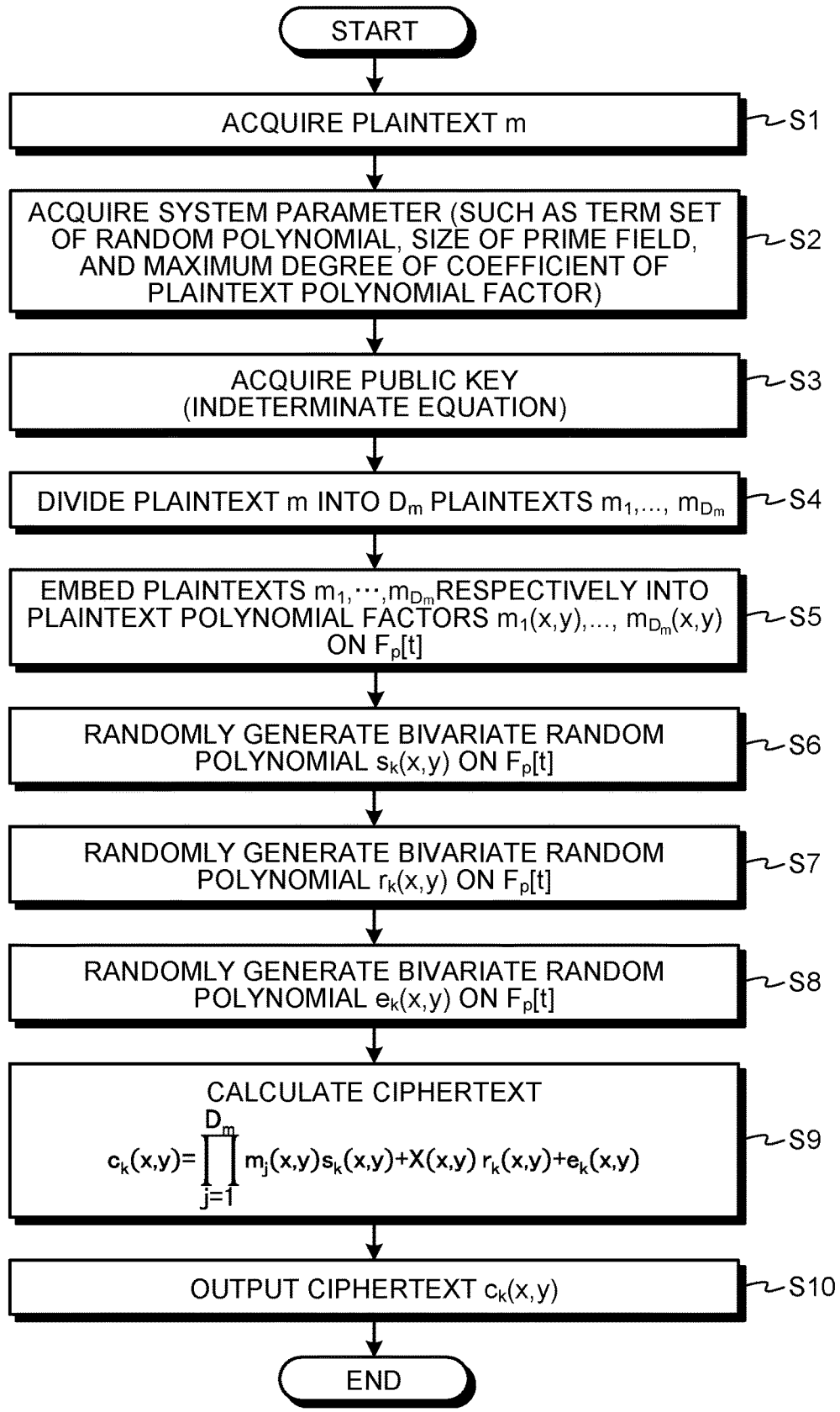
FIG. 5 is a flowchart illustrating an example of the encryption method of the embodiment.

First, the configuration and the flow of processing of the encryption device of the present embodiment will be described along the flowchart illustrated in FIG. 5 with reference to the overall configuration diagram illustrated in FIG. 4.

An encryption device 10 of the embodiment includes a plaintext acquisition unit 1, a public-key acquisition unit 2, a plaintext embedding unit 3, a memory unit 4, an encryption unit 5, a polynomial generation unit 6, a random value generation unit 7, a polynomial operation unit 8, and a ciphertext output unit 9.

To begin with, the plaintext acquisition unit 1 acquires a plaintext m (Step S1). The plaintext acquisition unit 1 acquires, as the plaintext m, encryption target data acquired from another application or another device, for example. The plaintext acquisition unit 1 inputs the plaintext m into the plaintext embedding unit 3.

Next, the plaintext embedding unit 3 acquires system parameters p, $D_m$, and $d_m$ from the memory unit 4 (Step S2).

Next, the public-key acquisition unit 2 acquires a bivariate indeterminate equation $X(x,y)$ as a public key (Step S3). The public-key acquisition unit 2 acquires the public key from another device such as a key generation device described later for example.

Subsequently, the plaintext embedding unit 3 divides the plaintext m given by the plaintext acquisition unit 1 into $3(d_m+1)$ sub-blocks of $|p|$ bits ($|p|$ is the bit length of p). Then, the plaintext embedding unit 3 subdivides each sub-block into $D_m$ plaintext fragments (Step S4).

It should be noted that any division method may be used as long as it allows restoration when $D_m$ plaintext fragments are complete, and examples thereof include a method using the above described sum.

The plaintext embedding unit 3 sequentially embeds the plaintext fragments in $D_m$ plaintext polynomial factors (Step S5). In the present embodiment, the plaintext polynomial factors are a linear expression, so that $m_j(x,y)=m_{j,x}(t)x+m_{j,y}(t)y+m_{j,1}(t)$ (j=1, . . . , $D_m$), where the degree of each coefficient $m_{j,x}(t)$, $m_{j,y}(t)$, and $m_{j,1}(t)$ is $d_m$, and the coefficients of these polynomials are elements of $F_p$. The plaintext embedding unit 3 embeds the plaintext fragments in each of the plaintext polynomial factors of the linear expression to generate plaintext polynomial factors $m_1(x,y)$, . . . , $mt_{Dm}(x,y)$.

As described above, the block size of the cryptographic method of the present embodiment is $3(|p|)(d_m+1)$. If a plaintext larger than this size is input, it is divided into this block size and then each block is encrypted.

The plaintext embedding unit 3 inputs the generated $D_m$ plaintext polynomial factors to the encryption unit 5.

Upon receiving the public key from the public-key acquisition unit 2, the encryption unit 5 acquires, from the memory unit 4, system parameters p, $D_s$, $D_l$, $d_e$, $d_x$, $d_r$, and $d_e$ that match the public key.

In addition, the encryption unit 5 inputs the system parameters p, $D_s$, and $d_s$ to the polynomial generation unit 6 and instructs the polynomial generation unit 6 to generate a two random polynomials having, as coefficients, a polynomial $s_1(x,y)$ and $s_2(x,y)$ of the degree $d_s$ according to the maximum term set (hereinafter, simply referred to as a term set) $\Gamma_s$ generated from these. The polynomial generation unit 6 instructs the random value generation unit 7 to generate integers from 0 to p−1 which is a coefficient of the coefficient $s_{ij}(t)$ by a required number (2d,#$\Gamma_s$ in this case), and generates $s_1(x,y)$ and $s_2(x,y)$ based on these integers (Step S6). Note that #$\Gamma_s$ represents the number of elements of the set $\Gamma_s$.

Next, the encryption unit 5 continues to generate the random polynomials $r_1(x,y)$ and $r_2(x,y)$ by the same method as the method of generating the random polynomials $s_1(x,y)$ and $s_2(x,y)$ by inputting the system parameters p, $D_l$, and $d_r$ to the polynomial generation unit 6 (Step S7).

Next, the encryption unit 5 continues to generate the random polynomials $e_1(x,y)$ and $e_2(x,y)$ by the same method as the method of generating the random polynomials $s_1(x,y)$ and $s_2(x,y)$ by inputting the system parameters p, $D_e$, and $d_e$ to the polynomial generation unit 6 (Step S8).

Finally, the encryption unit 5 generates, by using the following Formula (89), a ciphertext $c_k(x,y)$ (k=1, 2) from the random polynomial $s_k(x,y)$, $r_k(x,y)$, and $e_k(x,y)$ (k=1, 2) the public key X(x,y), and the $D_m$ plaintext polynomial factors $m_1(x,y)$, . . . , $m_{Dm}(x,y)$ (Step S9). Here, the polynomial operation unit 8 executes multiplication of the $D_m$ plaintext polynomial factors $m_i(x,y)$, . . . , $M_{Dm}(x,y)$. The encryption unit 5 inputs the ciphertext $c_k(x,y)$ (k=1, 2) to the ciphertext output unit 9.

$$c_k(x,y) = \prod_{j=1}^{D_m} m_j(x,y)s_k(x,y) + X(x,y)r_k(x,y) + e_k(x,y)(k=1,2) \quad (89)$$

The ciphertext output unit 9 outputs the ciphertext $c_k(x,y)$ (k=1, 2) as an output of the encryption device 10 (if necessary, after transforming it according to a predetermined format)(Step S10).

Figure 6:
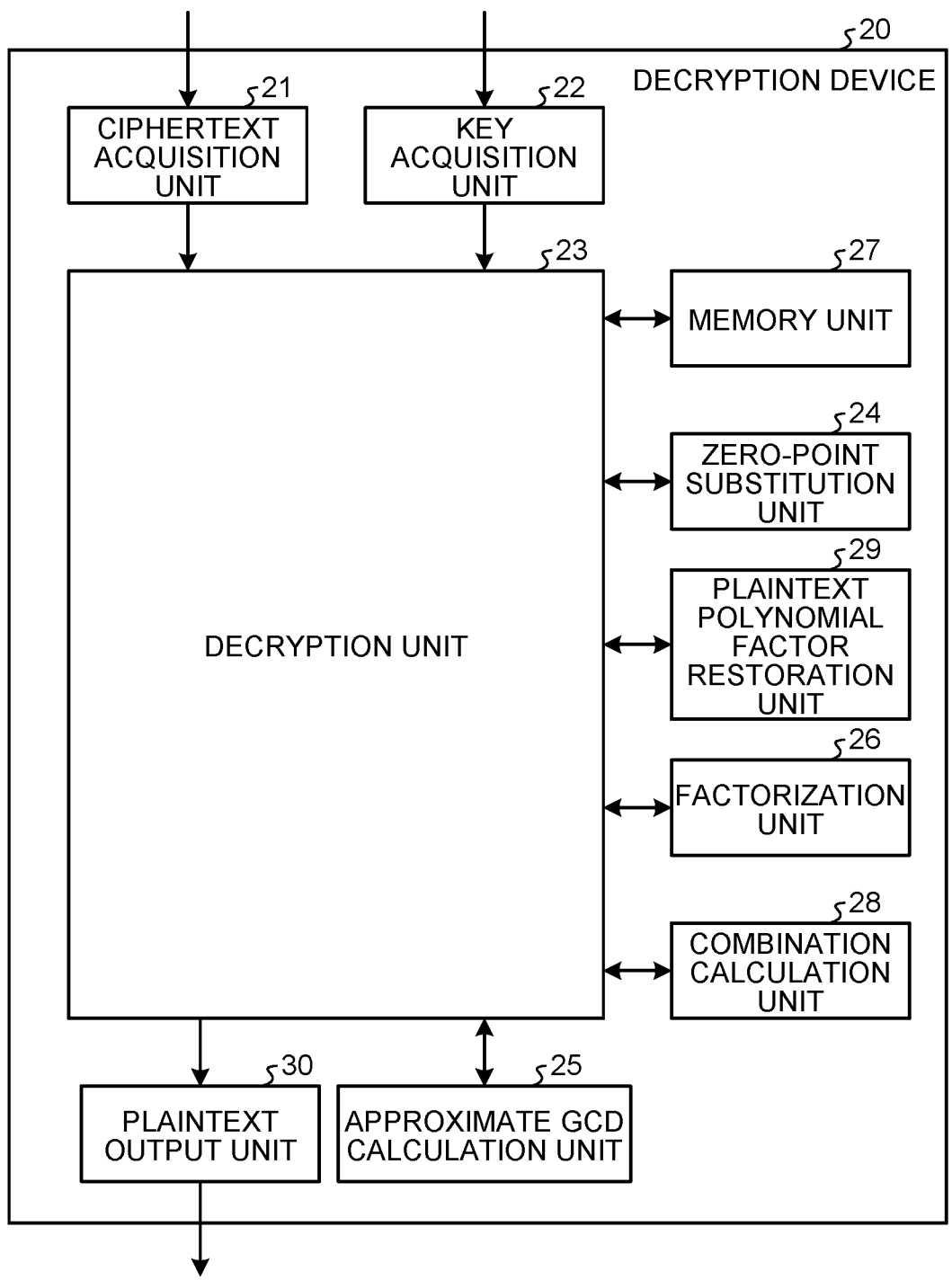
FIG. 6 is a diagram illustrating a first example (a case of decryption (No. 1)) of a functional configuration of a decryption device according to the embodiment.
Figure 7:
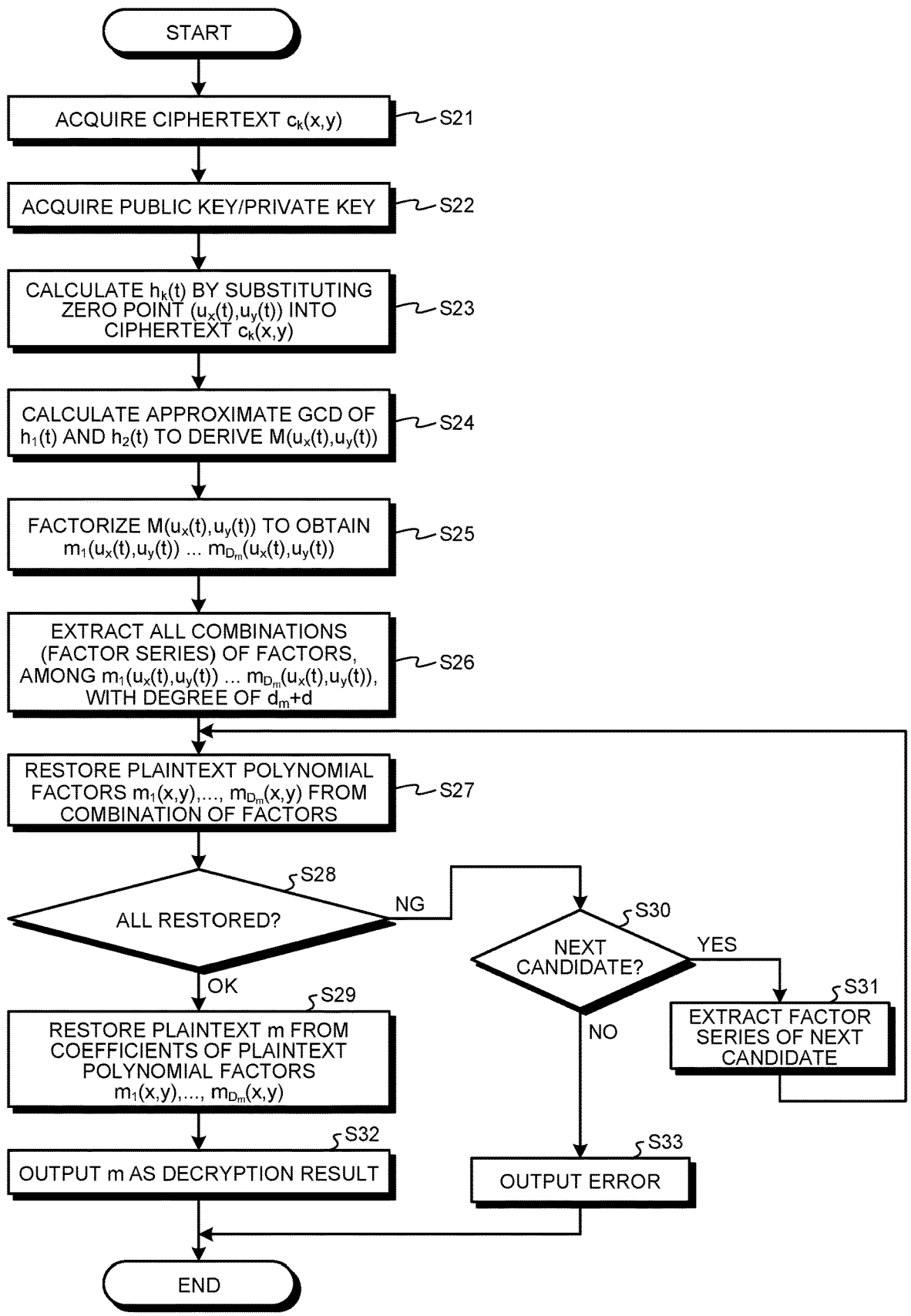
FIG. 7 is a flowchart illustrating a first example (the case of decryption (No. 1)) of a decryption method according to the embodiment.

Next, the configuration and the flow of processing of the decryption device of the present embodiment for executing decryption (No. 1) will be described along the flowchart illustrated in FIG. 7 with reference to the overall configuration diagram illustrated in FIG. 6.

The decryption device 20 of the embodiment includes a ciphertext acquisition unit 21, a key acquisition unit 22, a decryption unit 23, a zero-point substitution unit 24, an approximate GCD calculation unit 25, a factorization unit 26, a memory unit 27, a combination calculation unit 28, a plaintext polynomial factor restoration unit 29, and a plaintext output unit 30.

To begin with, the ciphertext acquisition unit 21 acquires the ciphertext $c_k(x,y)$ (k=1, 2) (Step S21). The ciphertext acquisition unit 21 acquires the ciphertext $c_k(x,y)$ from another device over a network, for example.

Next, the key acquisition unit 22 acquires the public key (X(x,y)) and a private key (zero point u: ($u_x(t)$, $u_y(t)$)) (Step S22). The key acquisition unit 22 acquires a public key (X(x,y)) from another device or the like over a network, and acquires the private key (zero point u: ($u_x(t),u_y(t)$)) from the memory unit 27 in the decryption device.

Next, the decryption unit 23 receives the ciphertext $c_k(x,y)$ (k=1, 2) from the ciphertext acquisition unit 21 and receives the public key (X(x,y)) and the private key (zero point u: ($u_x(t)$, $u_y(t)$)) from the key acquisition unit 22. Then decryption processing is started.

First of all, the decryption unit 23 inputs the ciphertext $c_k(x,y)$ (k=1, 2) and the zero point u to the zero-point substitution unit 24. The zero-point substitution unit 24 substitutes the zero point u into $c_k(x,y)$ and calculates $h_k(t)$ (k=1, 2) (Step S23). The zero-point substitution unit 24 inputs $h_k(t)$ to the decryption unit 23.

Next, upon receiving $h_k(t)$ from the zero-point substitution unit 24, the decryption unit 23 inputs $h_k(t)$ (k=1, 2) and the degree $d_M$ of $\Pi_{j=1}^{Dm}m_j(u_x(t),u_y(t))$ to the approximate GCD calculation unit 25. Upon receiving $h_k(t)$ (k=1, 2) and the degree $d_M$ of $\Pi_{j=1}^{Dm}m_j(u_x(t),u_y(t))$ from the decryption unit 23, the approximate GCD calculation unit 25 calculates the approximate GCD with the degree $d_M$ of $h_k(t)$ (k=1, 2), and inputs the approximate GCD (M($u_x(t),u_y(t)$)) to the decryption unit 23 (Step S24). Here, $d_M$ is assumed to be Dm(d+dm).

Next, upon receiving the approximate GCD (M($u_x(t),u_y(t)$)) from the approximate GCD calculation unit 25, the decryption unit 23 inputs the approximation GCD to the factorization unit 26. Upon receiving the approximate GCD (M($u_x(t),u_y(t)$)) from the decryption unit 23, the factorization unit 26 executes the factorization of the approximate GCD (Step S25), and inputs the result of the factorization to the decryption unit 23 as an ordered factor array of factors.

Next, the decryption unit 23 extracts system parameters d and $d_m$ from the memory unit 27, extracts the degree of each factor from the factor array input from the factorization unit 26, and generates a corresponding degree array. Furthermore, the decryption unit 23 inputs the degree array and N(=$d_m$+d) corresponding to the degree of the plaintext polynomial factors to the combination calculation unit 28. The combination calculation unit 28 extracts all combinations of factors (factor series), each of whose degree is exactly N (Step S26), and inputs a list of the factor series to the decryption unit 23.

Upon receiving the list of the factor series from the combination calculation unit 28, the decryption unit 23 extracts the factor series from the list and inputs it to the plaintext polynomial factor restoration unit 29, together with the zero point u and the system parameters d and $d_m$. The plaintext polynomial factor restoration unit 29 restores plaintext polynomial factors $m_1(x,y), \ldots, m_{Dm}(x,y)$ from the factor series input from the decryption unit 23, the zero point u, and the system parameter $d_m$ by the above method (Step S27), and inputs the plaintext polynomial factors to the decryption unit 23.

Next, the plaintext polynomial factor restoration unit 29 determines whether or not all the plaintext polynomial factors have been restored (Step S28).

In response to determining that all the plaintext polynomial factors have been successfully restored (Step S28, OK), and upon receiving the plaintext polynomial factors $m_1(x,y), \ldots, m_{Dm}(x,y)$ from the plaintext polynomial factor restoration unit 29, the decryption unit 23 extracts the plaintext divided from the coefficients of the plaintext polynomial factors and restores the plaintext m (Step S29). Next, the plaintext output unit outputs the plaintext m as the decryption result (Step S32), and the decryption processing ends.

On the other hand, in response to determining that all the plaintext polynomial factors have not been successfully restored (Step S28, NG), the decryption unit 23 determines whether or not there is a next plaintext polynomial factor candidate (Step S30).

In response to determining that there is a next plaintext polynomial factor candidate (Step S30, Yes), the decryption unit 23 extracts the next plaintext polynomial factor candidate (Step S31), and returns to the process in Step S27. Specifically, when all the plaintext polynomial factors have not been successfully restored, the plaintext polynomial factor restoration unit 29 transmits an error signal to the decryption unit 23. Upon receiving the error signal from the plaintext polynomial factor restoration unit 29, the decryption unit 23 refers to the list of factor series and transmits a next candidate factor series together with the zero point u and the system parameters d and $d_m$ to the plaintext polynomial factor restoration unit 29.

When there is no next plaintext polynomial factor candidate (Step S30, No), the decryption unit 23 notifies the plaintext output unit 30 of the decryption error, and the plaintext output unit 30 outputs an error signal indicating a decryption failure and empty decryption result (Step S33), and the decryption processing ends.

Examples of a cause of the decryption failure include situations where the ciphertext has been broken or illegally altered on the communication path. Of course, there may be an unavoidable case as described in the above "Decryption failure probability". Still, with the decryption failure probability sufficiently reduced (to $2^{-64}$ or less for example), the probability of occurrence of such a case may be reduced to a negligible level.

Figure 8:
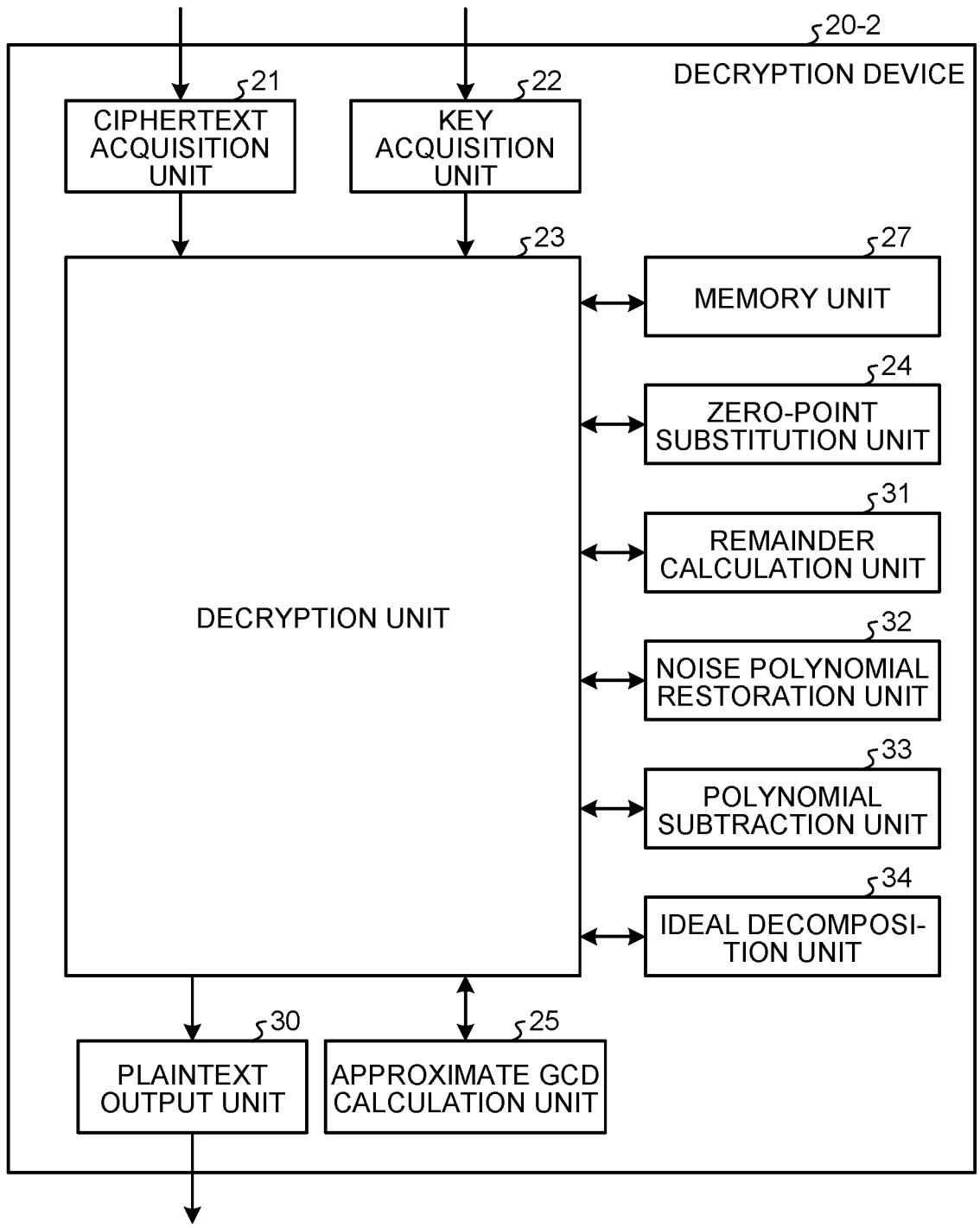
FIG. 8 is a diagram illustrating a second example (a case of decryption (No. 2)) of a functional configuration of a decryption device according to the embodiment.

Next, the configuration and the flow of processing of the decryption device of the present embodiment for executing decryption(No. 2) will be described along the flowchart illustrated in FIG. 9 with reference to the overall configuration diagram illustrated in FIG. 8.

The decryption device 20-2 of the embodiment includes a ciphertext acquisition unit 21, a key acquisition unit 22, a decryption unit 23, a zero-point substitution unit 24, an approximate GCD calculation unit 25, a memory unit 27, a plaintext output unit 30, a remainder calculation unit 31, a noise polynomial restoration unit 32, a polynomial subtraction unit 33, and an ideal decomposition unit 34.

The processing in Steps S41 to S44 is the same as that in Steps S21 to S24 (see FIG. 7) in the decryption (No. 1), and thus description thereof is omitted.

Upon receiving the approximate GCD a(t) from the approximate GCD calculation unit 25, the decryption unit 23 calculates $h_k(t)$ mod a(t) using the remainder calculation unit 31 to obtain $e_k(u_x(t), u_y(t))$ (Step S45). The decryption unit 23 inputs $e_k(u_x(t),u_y(t))$ together with the zero point u and the system parameters d and d, to the noise polynomial restoration unit 32.

Next, the noise polynomial restoration unit 32 restores the noise polynomials $e_1(x,y)$ and $e_2(x,y)$ from the factor series, the zero point u, and the system parameter $d_e$ through the above-described method (Step S46), and inputs $e_1(x,y)$ and $e_2(x,y)$ to the decryption unit 23.

Next, the decryption unit 23 calculates $c_k(x,y)-e_k(x,y)$ from $e_k(x,y)$ by using the polynomial subtraction unit 33, and inputs $c_k(x,y)-e_k(x,y)$ to the ideal decomposition unit 34. The ideal decomposition unit 34 performs ideal decomposition on each $c_k(x,y)-e_k(x,y)$ to obtain $m_1(x,y), \ldots, m_{Dm}(x,y), s_1(x,y)$ and $m_1(x,y), \ldots, m_{Dm}(x,y), s_2(x,y)$ (Step S47) and inputs these factors and polynomials to the decryption unit 23.

From the factors and polynomials, the decryption unit 23 identifies plaintext polynomial factors $m_1(x,y), \ldots, m_{Dm}(x,y)$ as common parts, and identifies a set of random polynomials $s_1(x,y)$ and $s_2(x,y)$ as other parts. Note that, in a case where a plurality of candidates are obtained, the ideal decomposition unit 34 outputs a factor series including a set of plaintext polynomial factors and a set of random polynomials as a single set.

When the factor series having a set of the plaintext polynomial factors and a set of the random polynomials as a single set is calculated, the decryption unit 23 calculates the following Formula (90) using $e_k(x,y)$ (k=1, 2) calculated by the processing of Step S46, and restores $r_k(x,y)$ (k=1, 2) by dividing the following Formula (90) by X(x,y) (Step 48).

$$c_k(x, y) - e_k(x, y) - \prod_{j=1}^{D_m} m_j(x, y)s_k(x, y) \tag{90}$$

Next, the decryption unit 23 determines whether or not all $r_k(x,y)$ (k=1, 2) have been restored (Step S49). Specifically, in a case where the remainder obtained as a result of the division by X(x,y) is not 0, it means that $r_k(x,y)$ (k=1, 2) have failed to be successfully restored.

In response to determining that all $r_k(x,y)$ (k=1, 2) have not been successfully restored (Step S49, NG), the decryption unit 23 determines whether or not there is a next candidate factor series (set of plaintext polynomial factors $m_1(x,y), \ldots, m_{Dm}(x,y)$ and set of random polynomials $s_k(x,y)$ (k=1, 2))(Step S50).

In response to determining that there is the next candidate factor series (Step S50, Yes), the decryption unit 23 extracts the next candidate factor series (Step S51), and the processing returns to Step S47.

In response to determining that there is no next candidate factor series (Step S50, No), the decryption unit 23 notifies the plaintext output unit 30 of the decryption error, and the plaintext output unit 30 outputs an error signal indicating a decryption failure and empty decryption result (Step S53), and the decryption processing ends.

In response to determining that $r_k(x,y)$ (k=1, 2) have been all successfully restored (Step S49, OK), the decryption unit 23 restores the plaintext m, and the plaintext output unit 30 outputs the plaintext m as a decoding result (Step S52), and terminates the decryption processing.

Figure 10:
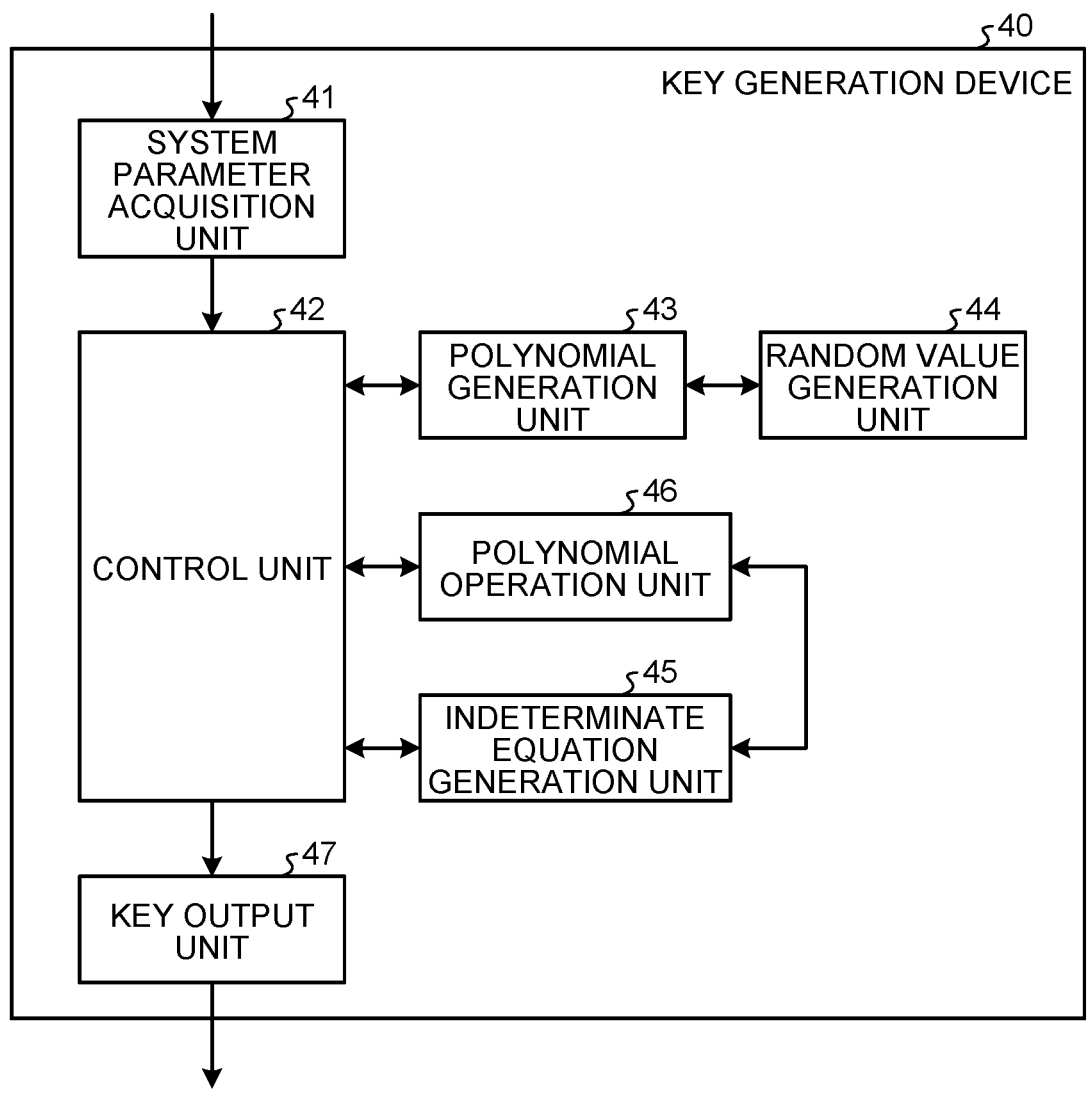
FIG. 10 is a diagram illustrating an example of a functional configuration of a key generation device of the embodiment.
Figure 11:
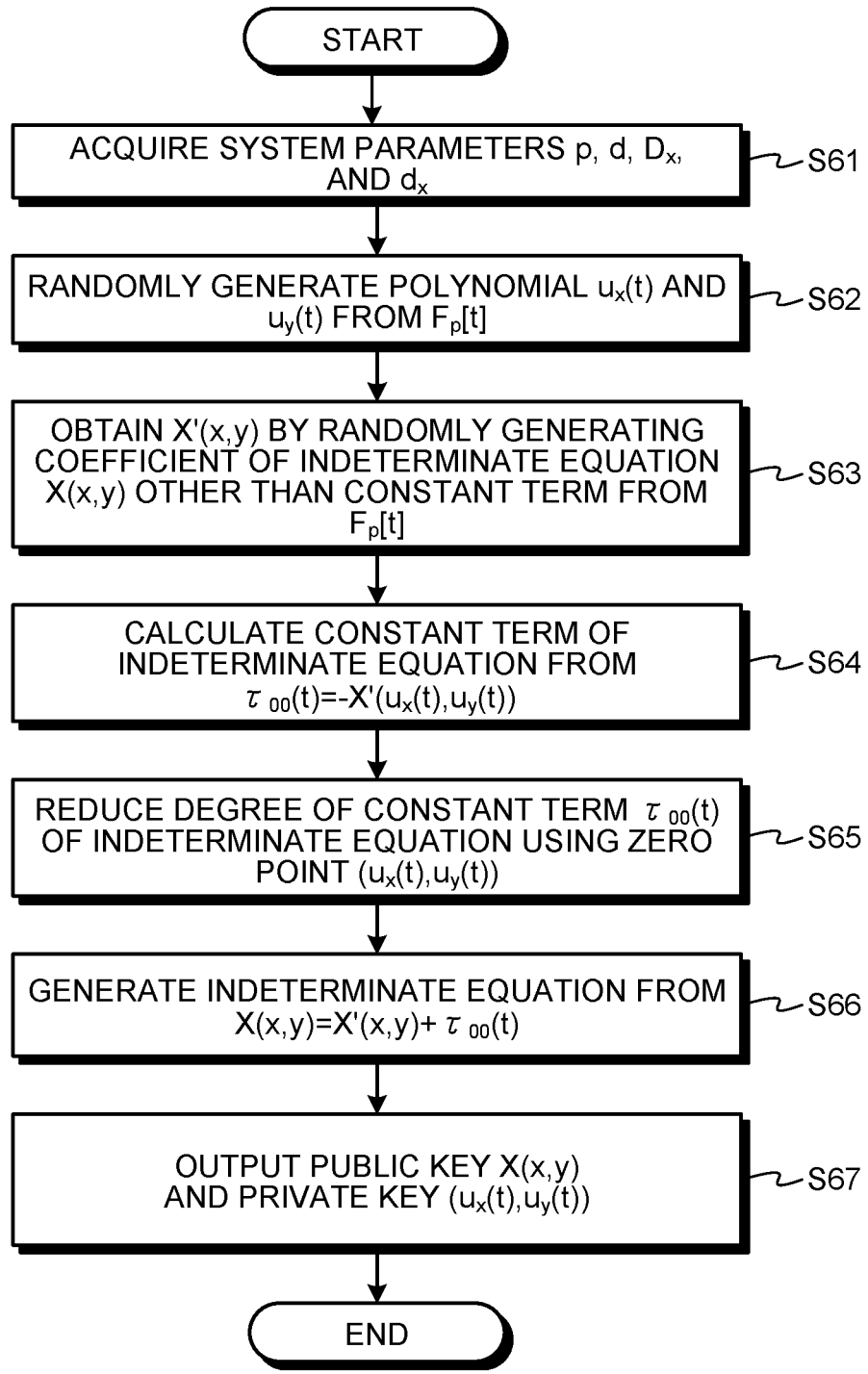
FIG. 11 is a flowchart illustrating an example of a key generation method of the embodiment.

Next, the configuration and the flow of processing of the key generation device of the present embodiment will be described along the flowchart illustrated in FIG. 11 with reference to the overall configuration diagram illustrated in FIG. 10.

A key generation device 40 of the embodiment includes a system parameter acquisition unit 41, a control unit 42, a polynomial generation unit 43, a random value generation unit 44, an indeterminate equation generation unit 45, a polynomial operation unit 46, and a key output unit 47.

To begin with, the system parameter acquisition unit 41 acquires the system parameters p, d, $D_x$, and $d_x$ (Step S61). The system parameters p, d, $D_x$, and $d_x$ are acquired by, for example, receiving an input from the user. Alternatively, for example, the system parameters p, d, $D_x$, and $d_x$ are acquired by reading setting data, or the like including the system parameters p, d, $D_x$, and $d_x$.

The system parameter acquisition unit 41 inputs the system parameters to the control unit 42. The control unit 42 performs the following processing in cooperation with other processing units based on the system parameters input from the system parameter acquisition unit 41.

First, the control unit 42 inputs, to the polynomial generation unit 43, p and d among the system parameters input from the system parameter acquisition unit 41, and instructs the generation of two polynomials $u_x(t)$, $u_y(t)$ included in $F_p[t]$. Next, the polynomial generation unit 43 instructs the random value generation unit 44 to generate 2(d+1) integers from 0 to p−1. The random value generation unit 44 generates 2(d+1) random numbers from 0 to p−1 using a pseudo random number generator or the like, and inputs the random numbers to the polynomial generation unit 43. The polynomial generation unit 43 generates polynomials $u_x(t)$ and $u_y(t)$ having 2(d+1) random numbers input from the random value generation unit 44 as coefficients (Step S62), and inputs the polynomials $u_x(t)$ and $u_y(t)$ to the control unit 42.

The control unit 42 holds (stores), as a private key, the polynomials $u_x(t)$ and $u_y(t)$ received from the polynomial generation unit 43.

The control unit 42 also generates a public key (indeterminate equation X(x,y) represented by the following Formula (91)).

$$X(x,y) = \Sigma_{(i,j) \in \Gamma_X} \tau_{ij}(t) x^i y^j \quad (91)$$

The control unit 42 extracts a coefficient $\tau_{ij}(t)$ other than the constant term of X(x,y) from $F_p[t]$ in order to generate the public key. Specifically, the control unit 42 inputs the parameters p and d to the polynomial generation unit 43, as in the case of generating the above-described polynomials $u_x(t)$ and $u_y(t)$, and instructs the generation of #$\Gamma_x$−1 polynomials $\tau_{ij}(t)$ included in $F_p[t]$. The polynomial generation unit 43 generates a polynomial $\tau_{ij}(t)$ using the random value generation unit 44 and generates #$\Gamma_x$−1 polynomials $\tau_{ij}(t)$. The polynomial generation unit 43 inputs #$\Gamma_x$−1 polynomials $\tau_{ij}(t)$ to the control unit 42.

The control unit 42 inputs the polynomials $\tau_{ij}(t)$ generated by the polynomial generation unit 43, the system parameters p, d, $\Gamma_x$, $d_x$, and the private key $u_x(t)$, $u_y(t)$ to the indeterminate equation generation unit 45.

The indeterminate equation generation unit 45 generates, by using the polynomial operation unit 46, an indeterminate equation X'(x,y) having no constant term (Step S63). The indeterminate equation generation unit 45 calculates a constant term $\tau_{00}(t) = -X'(u_x(t), u_y(t))$ by substituting the private key (polynomials $u_x(t)$ and $u_y(t)$) into the variables x and y of X'(x,y) (Step S64).

Next, the indeterminate equation generation unit 45 performs processing of reducing the degree of the constant term $\tau_{00}(t)$ (Step S65).

An example of this processing of reducing the degree will be described in detail with reference to FIG. 12. In this degree reduction processing, the constant term $\tau_{00}(t)$ and the private key $u_x(t)$ and $u_y(t)$ is input, and another indeterminate equation is created with a constant term of the degree d or less among indeterminate equations having the same zero point.

The basic principle is to use the private key (zero point) for replacement with an indeterminate equation with a smaller degree of a constant term having the same zero point, and the theoretical background is as described above.

For simplicity, it is assumed in the following description that X(x,y) includes all terms of $x^i$ (i=1, ..., degX). To begin with, the indeterminate equation generation unit 45 sets i=degX(x,y) (Step S71), calculates $\tau_{00}(t)$ mod $u_x(t)^i$, replaces $\tau_{00}(t)$, and calculates $\tau_{i0}'(t) = \tau_{00}(t)/u_x(t)^i$ (Step S72), and replaces X'(x,y) with X'(x,y)+$\tau_{i0}'(t)x^i$ (Step S73). This processing is continued while decrementing i by 1 (Step S74) until i becomes 1 (Step S75).

Figure 12:
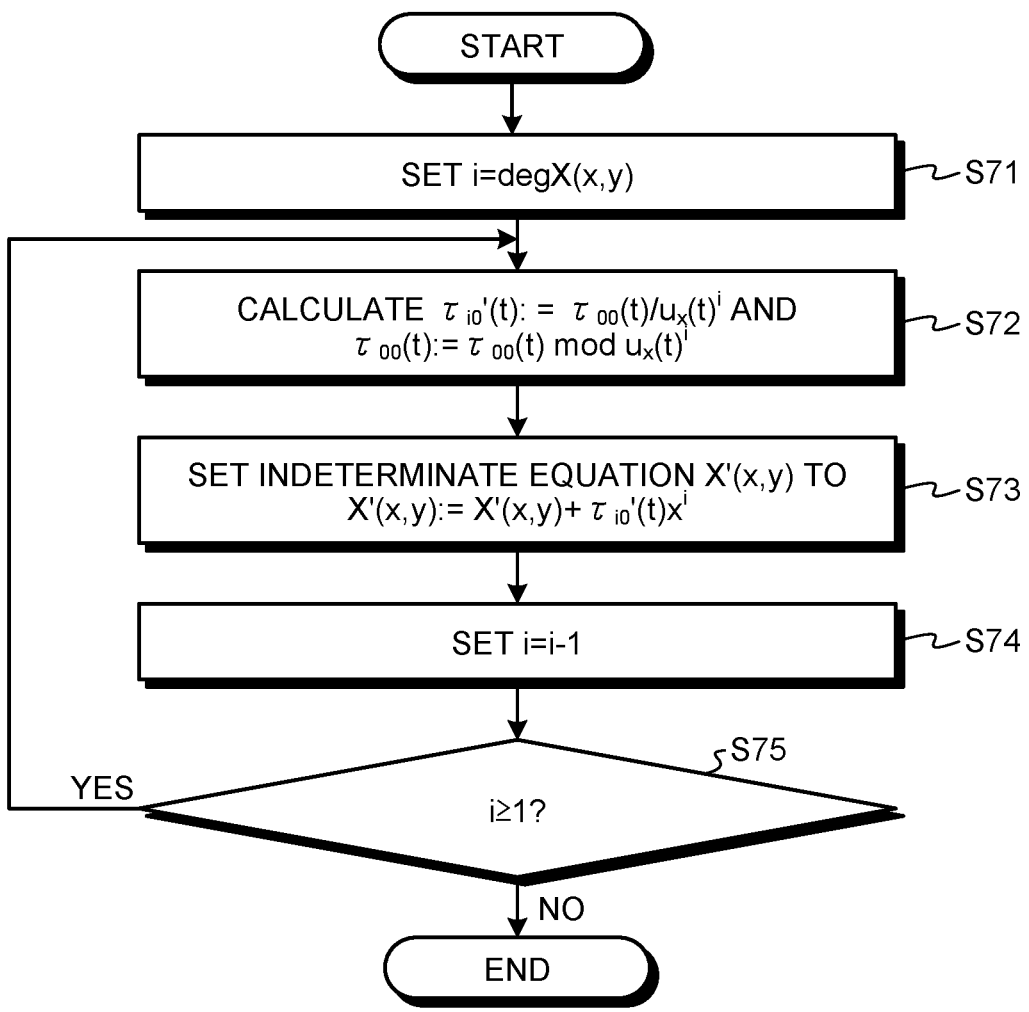
FIG. 12 is a flowchart illustrating an example of degree reduction processing (details of Step S65) of the embodiment.

Now, returning to FIG. 11, when the processing in FIG. 12 is performed for X'(x,y), the result is as follows. Assuming that $\tau_{00}(t)$ is set to $\tau_{00}(t) = -X'(u_x(t), u_y(t))$, and the degree $d_x$ of each coefficient of X'(x,y) is d−1, the degree of $\tau_{00}(t)$ does not exceed d(degX(x,y)+1)−1 and is expected to be approximately d(degX(x,y)+1)−1. On the other hand, the processing in FIG. 12 causes the degree of $\tau_{00}(t)$ to be less than ddegX(x,y)−1, which is reduced by about the degree d compared to the original $\tau_{00}(t)$. Furthermore, since $\tau_{i0}'(t)$ is a quotient obtained by dividing $\tau_{00}(t)$ by $u_x(t)^{degX(x,y)}$, the degree becomes d−1 or less, and does not exceed the degree of $\tau_{i0}(t)$. Based on this, it can be seen that by the processing in FIG. 12, the indeterminate equation X'(x,y) can reduce the degree of the constant term by d without changing the degrees of the coefficients other than the constant term. By continuing this operation until i becomes 0, it is possible to reduce only the constant term to than d−1 or less without finally changing the degrees of the coefficients other than the constant term of X'(x,y).

Next, the indeterminate equation generation unit 45 generates an indeterminate equation by X(x,y)=X'(x,y)+$\tau_{00}(t)$ (Step S66).

It is shown that the generated X(x,y) has the same zero point ($u_x(t)$, $u_y(t)$) as the original indeterminate equation X'(x,y)+$\tau_{00}(t)$. To this end, it is necessary to show that the indeterminate equation obtained in each step has the zero point ($u_x(t)$, $u_y(t)$). The indeterminate equation obtained in each step is X'(x,y)+$\tau_{i0}'(t)x^i$+($\tau_{00}(t)$ mod $u_x(t)^i$). Substituting the zero point ($u_x(t)$, $u_y(t)$) into this equation gives the following Formula (92), which shows that the zero point is obtained.

$$X'(u_x(t), u_y(t)) + \tau_{i0}'(t) u_x(t)^i + \tau_{00}(t) = X'(u_x(t), u_y(t)) + \tau_{00}(t) = 0 \quad (92)$$

The indeterminate equation X(x,y) thus generated is output from the indeterminate equation generation unit 45 to the control unit 42. Upon confirming the series of processes described above is completed, the control unit 42 inputs the generated public key (X(x,y), f(t)) and private key ($u_x(t)$, $u_y(t)$) to the key output unit 47. The key output unit 47 outputs the public key (X(x,y)) and the private key ($u_x(t)$, $u_y(t)$) input from the control unit 42 to the outside of the key generation device 40 (Step S67).

Specific Configuration Regarding Variation Described Above

Next, a specific configuration related to the above-described variations (modifications) will be described.

The variation of the ciphertext can be realized by calculating the variation by the above Formula (82) in the step of creating the ciphertext in the encryption unit 5 of the encryption device 10 and performing an obvious modification in consideration of this in the decryption device 20.

The variation related to the public key compression can be realized by adding a random number seed to an input to the random value generation unit 44 in the key generation device 40, or adding a random number seed used for generation in the random value generation unit 44 to an output from the random value generation unit 44, and finally outputting, instead of the public key $X(x,y)$, the adjusted coefficient and the random number seed from the key output unit 47. Note that, upon receiving the public key, the encryption device 10 and the decryption device 20 can restore the original public key $X(x,y)$ by restoring a coefficient that is not adjusted using the random number seed and adding an adjusted coefficient included in the public key.

In the variation related to the public key coefficient, the range of random numbers is set to 1 to p−1 for the random value generation unit 44 of the key generation device 40 to generate the coefficient of the coefficient $\tau_{ij}(t)$ of the public key $X(x,y)$. In the step (step of reducing the degree of the constant term $\tau_{00}(t)$ of the indeterminate equation using the zero point $(u_x(t), u_y(t))$ of adjusting the coefficient, when the adjusted coefficient $\tau_{i0}(t)$ (i=0, . . . , $D_X$) includes a non-zero coefficient, the adjustment is realized by redoing the processing from the stage of randomly generating the coefficient other than the constant term of the indeterminate equation $X(x,y)$.

The variation for obtaining the term set is realized by changing the system parameters $D_\xi$ and $d_\xi$ to the designated term set $\Gamma_\xi$ and generating a public key, a random polynomial, and a noise polynomial based on $\Gamma_\xi$ in each of the key generation device 40 and the encryption device 10. Here, $\xi$ is X, s, r, or e.

Figure 13:
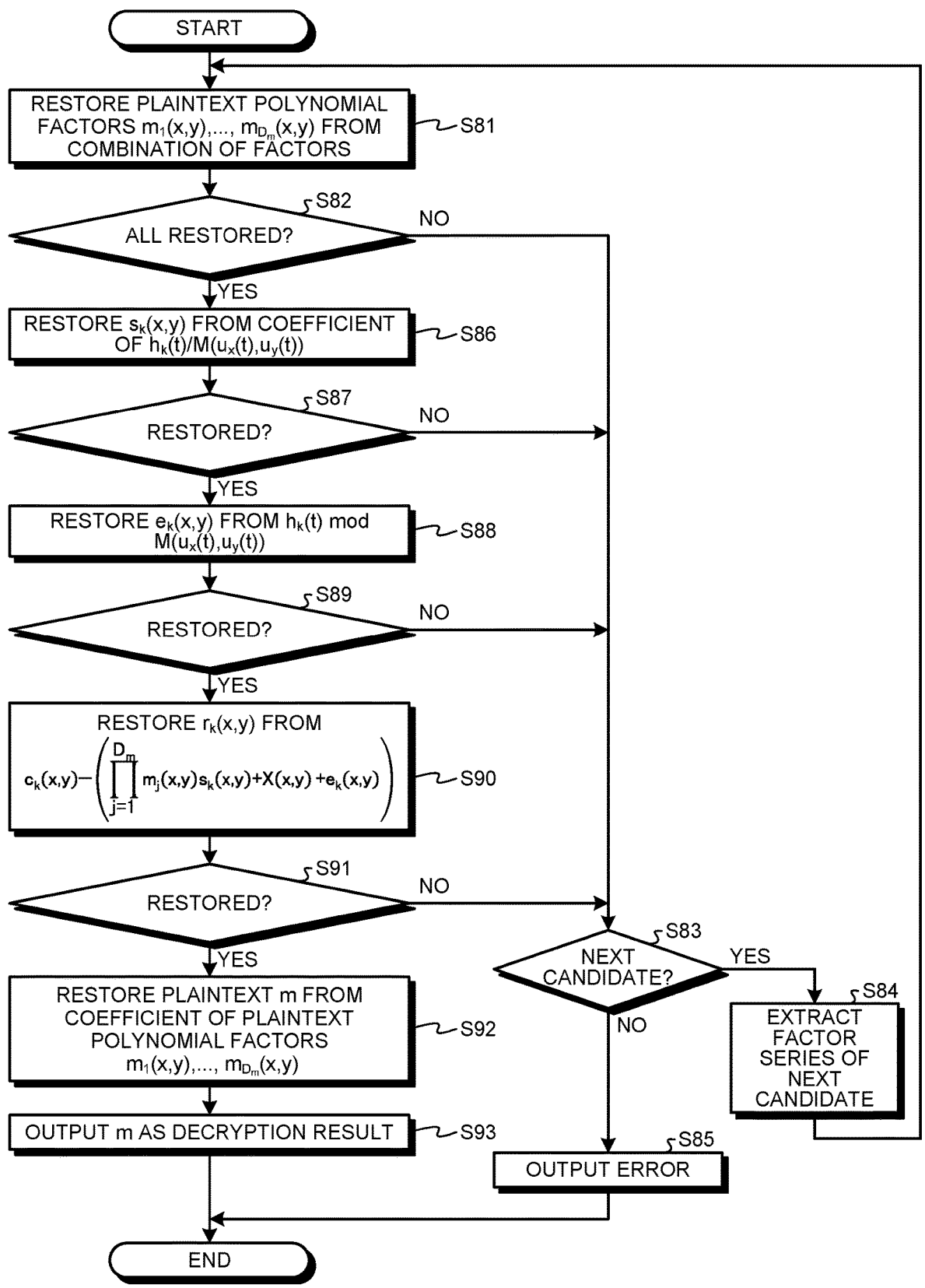
FIG. 13 is a flowchart illustrating an example of a decryption method according to a modification of the embodiment.

The variation for obtaining $s_k$, $r_k$, and $e_k$ in the decryption (No. 1) is realized as in a flowchart illustrated in FIG. 13. Specifically, in the processing of the flowchart illustrated in FIG. 7 in the decryption device 20 illustrated in FIG. 6, after the step of extracting all the factor series in FIG. 7 (Step S26), the decryption unit 23 extracts one factor series and inputs the one factor series together with the zero point u and the system parameters d and $d_m$ to the plaintext polynomial factor restoration unit 29.

Specifically, the plaintext polynomial factor restoration unit 29 restores plaintext polynomial factors $m_1(x,y)$, . . . , $m_{Dm}(x,y)$ from the factor series input from the decryption unit 23, the zero point u, and the system parameter $d_m$ by the above method (Step S81).

Next, the plaintext polynomial factor restoration unit 29 determines whether or not all the plaintext polynomial factors have been restored (Step S82).

In response to determining that there is a plaintext polynomial factor that cannot be restored (Step S82, No), the plaintext polynomial factor restoration unit 29 transmits an error signal to the decryption unit 23. In this case, the decryption unit 23 determines whether or not there is a next candidate factor series (Step S83). In response to determining that there is no next candidate factor series (Step S83, No), the decryption unit 23 notifies the plaintext output unit 30 of the decryption error. The plaintext output unit 30 outputs a decryption error and empty decryption result (Step S85), and the decryption processing ends.

In response to determining that there is the next candidate factor series (Step S83, Yes), the decryption unit 23 extracts the next candidate factor series with reference to the list of factor series (Step S84). Then, the decryption unit 23 inputs the next candidate factor series together with the zero point u and the system parameters d and $d_m$ to the plaintext polynomial factor restoration unit 29, and the processing returns to Step S81.

On the other hand, in response to determining that there is no plaintext polynomial factor that cannot be restored (Step S82, Yes), the plaintext polynomial factor restoration unit 29 inputs the restored plaintext polynomial factor to the decryption unit 23. The decryption unit 23 calculates $s_k(u_x(t), u_y(t))$ from $h_k(t)/M(u_x(t), u_y(t))$ (k=1, 2) and inputs a result of the calculation together with the zero point u and the system parameters d and $d_s$ to the plaintext polynomial factor restoration unit 29. The plaintext polynomial factor restoration unit 29 restores $s_k(x,y)$ (Step S86), and inputs $s_k(x,y)$ to the decryption unit 23. If the restoration in step S86 fails (Step S87, No), the plaintext polynomial factor restoration unit 29 transmits an error signal to the decryption unit 23, and the processing proceeds to Step S83 described above.

When the random polynomial $s_k(x,y)$ is successfully restored (Step S87, Yes), the decryption unit 23 calculates $e_k(u_x(t), u_y(t))$ from $h_k(t)$ mod $M(u_x(t),u_y(t))$ (k=1, 2) and inputs this together with the zero point u and the system parameters d and $d_e$ to the plaintext polynomial factor restoration unit 29. The plaintext polynomial factor restoration unit 29 restores $e_k(x,y)$ (Step S88), and inputs $e_k(x,y)$ to the decryption unit 23. If the restoration in step S88 fails (Step S89, No), the plaintext polynomial factor restoration unit 29 transmits an error signal to the decryption unit 23, and the processing proceeds to Step S83 described above.

When the noise polynomial $e_k(x,y)$ is successfully restored (Step S89, Yes), the decryption unit 23 restores $r_k(x,y)$ from the following Formula (93) (Step S90), and confirms the restoration of $r_k(x,y)$ based on the fact that the remainder (remainder) of the division using the following Formula (93) is 0.

$$\left(c_k(x, y) - \left[\prod_{j=1}^{D_m} m_j(x, y) s_k(x, y) + e_k(x, y)\right]\right) / X(x, y) \quad (93)$$

If the restoration in step S90 fails (Step S91, No), the plaintext polynomial factor restoration unit 29 transmits an error signal to the decryption unit 23, and the processing proceeds to Step S83 described above.

When $m_j$, $s_k$, $e_k$, and $r_k$ are all successfully restored (Step S91, Yes), the processing proceeds to Step S92. The description on Steps S92 and S93 is the same as the description on Steps S29 and S32 (see FIG. 7) described above, and thus is omitted.

In the variation for embedding the plaintext information also in $s_k$, $r_k$, and $e_k$, instead of randomly generating $s_1(x,y)$, $s_2(x,y)$, $e_1(x,y)$, $e_2(x,y)$, $r_1(x,y)$, $r_2(x,y)$ in the encryption unit 5, (part of) the plaintext is embedded in a manner that is the same as that for embedding the plaintext in the polynomial. In the decryption device 20, (part of) the plaintext is restored as described above for decryption (No. 2), and (part of) the plaintext is restored in a manner as described in the above variation for decryption (No. 1). Then, the plaintext output unit 30 outputs (part of) the plaintext together with the plaintext m output from the plaintext polynomial factor.

Note that, when the plaintext including the plaintext polynomial $m_j(x,y)$ is embedded in part of these, after the decryption, the decryption unit 23 extracts information on the part where the plaintext is embedded after all the terms and factors including the plaintext information have been decrypted. Then, only the extracted information is output to the plaintext output unit 30. The variation in which the plaintext is not dispersed can be realized by making a change, so as to embed the order information in the plaintext polynomial factor in the plaintext embedding unit 3 in the encryption device 10, and referring to the order information and arranging the plaintext polynomial factors in the instructed order when the decryption device 20 restores the plaintext polynomial factor.

In the variation using no plaintext polynomial factor, it is only necessary to simply embed the plaintext into the plaintext polynomial in the plaintext embedding unit 3 of the encryption device 10. Furthermore, the plaintext can be restored only through extraction of coefficient information from the plaintext polynomial output, in the decryption device 20-2 illustrated in FIG. 8 for implementing decryption (No. 2).

Figure 14:
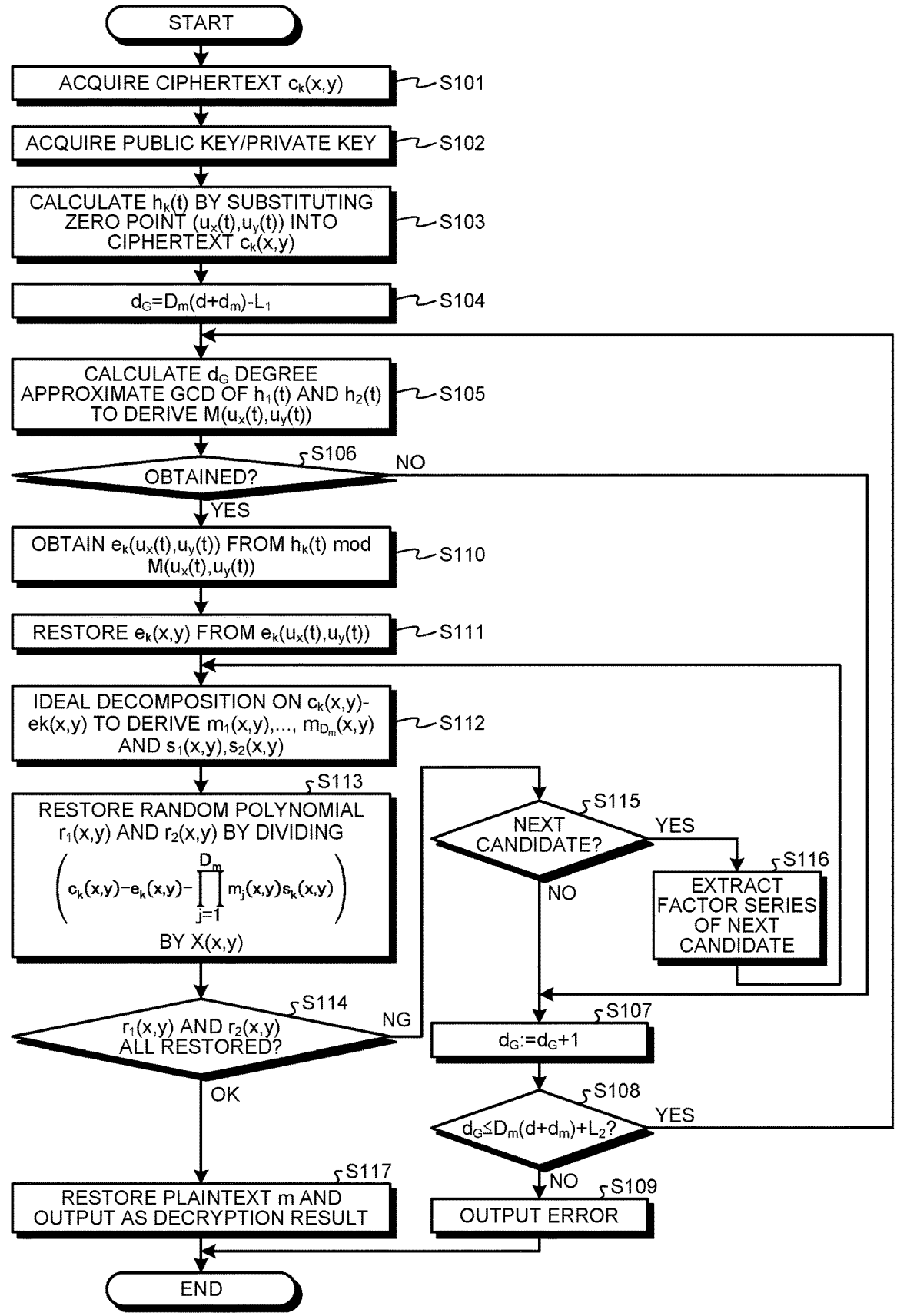
FIG. 14 is a flowchart illustrating an example of a decryption method according to a modification of the embodiment.

Regarding the variation of changing the degree of the approximate GCD in the approximate GCD calculation, a flowchart of decryption (No. 2) will be described with reference to, for example, FIG. 14. An example is illustrated where the approximate GCD is obtained with the degree of approximate GCD is defined as $d_G$, and with $d_G$ set to values in a range from a value smaller than the expected value $d_G=D_m(d+d_m)$ by $L_1$ to a value larger than the expected value by $L_2$.

The processing in Steps S101 and S102 is the same as that in Steps S41 to S42 (see FIG. 9) in the decryption (No. 2), and thus description thereof is omitted.

The zero-point substitution unit 24 calculates $h_k(t)$ by substituting the zero point $(u_x(t), u_y(t))$ in the decryption (No. 2) into the ciphertext $c_k(x,y)$ (Step S103), and then sets $d_G$ to $D_m(d+d_m)-L_1$ which is the minimum value thereof (Step S104).

The approximate GCD calculation unit 25 performs approximate GCD calculation with this $d_G$ (Step S105).

When the approximate GCD cannot be derived (Step S106, No), the zero-point substitution unit 24 increments $d_G$ by one (Step S107), and checks whether or not $d_G$ is equal to or less than the upper limit value $D_m(d+d_m)+L_2$ (Step S108). When the $d_G$ is equal to or less than the upper limit value $D_m(d+d_m)+L_2$ (Step S108, Yes), the approximate GCD calculation unit 25 performs the approximate GCD calculation again (Step S105).

When the $d_G$ exceeds the upper limit value $D_m(d+d_m)+L_2$ (Step S108, No), the plaintext output unit 30 outputs an error signal indicating a decryption failure and an empty decryption result (Step S109), and the decryption processing ends.

When the approximate GCD is successfully derived (Step S106, Yes), the decryption is continued with a method similar to the decryption (No. 2) (Steps S110 to S117). Here, Step S115 is different from the embodiment of the decryption (No. 2) illustrated in FIG. 9 described above.

Figure 9:
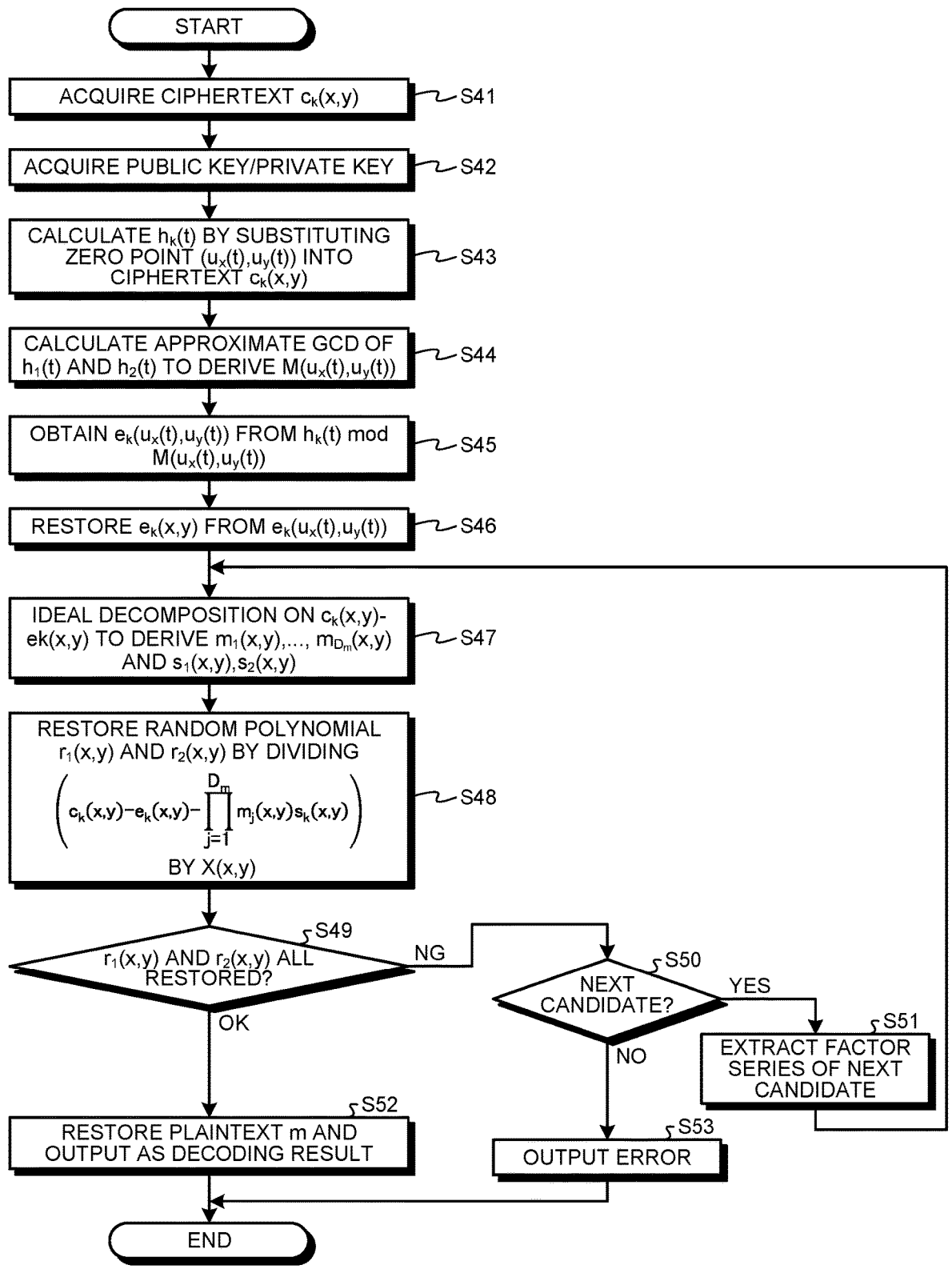
FIG. 9 is a flowchart illustrating a second example (the case of decryption (No. 2)) of a decryption method according to the embodiment.

In response to determining in Step S115 that there is no next candidate factor series, an error signal is not output as in the embodiment of the decryption (No. 2) illustrated in FIG. 9 described above (Step S53), and the processing is continued with $d_G$ incremented by one (Step S107). This is because even with an incorrect $d_G$, the decryption could be implemented to provide an incorrect plaintext polynomial factor. With the degree of the approximate GCD thus changed in the approximate GCD calculation, the probability of decryption failure can be reduced as much as possible.

Regarding the variation regarding variables, only the number of variables in the encryption algorithm, the decryption algorithm, and the key generation algorithm is needed to change from the present embodiment. That is, this can be implemented simply by obvious changes such as changes in the variables x and y to variables $x_1, \ldots, x_l$ and changes in the private key to be substituted into these variables to $(u_{x1}(t), \ldots, u_{xl}(t))$.

Regarding the variation for changing the degree of the coefficient $e_{i,j}(t)$ of the noise polynomial for each term, the part of the present embodiment changed is as follows. First of all, in the encryption, when the encryption unit 5 generates the noise polynomials $e_1(x,y)$ and $e_2(x,y)$, instead of inputting the system parameters p, $D_e$, and $d_e$ to the polynomial generation unit 6, each degree is designated to be p, $d_{e,De}, d_{e,De-1}, \ldots, d_{e,1}, d_{e,0}$, and an instruction is issued to the polynomial generation unit 6. Here, $d_{e,i}$ represents the degree of the i-th degree coefficient of $e_k(x,y)$.

Regarding the decryption, in the decryption (No. 2), when the random polynomial $s_k(x,y)$ is successfully restored, the decryption unit 23 calculates $e_k(u_x(t), \text{ and } u_y(t))$ from $h_k(t)$ mod $M(u_x(t),u_y(t))$ (k=1, 2) and inputs this together with the zero point u and the system parameters d, $d_{e,De}, d_{e,De-1}, \ldots, d_{e,1}, d_{e,0}$, to the plaintext polynomial factor restoration unit 29. The plaintext polynomial factor restoration unit 29 restores this, and inputs $e_k(x,y)$ to the decryption unit 23. When $e_k(x,y)$ fails to be restored, the plaintext polynomial factor restoration unit 29 inputs an error signal to the decryption unit 23.

Regarding the variation of introducing the product structure to the coefficient $e(x,y)$ of the noise polynomial, the part of the present embodiment to be changed is the encryption algorithm and the decryption algorithm. The encryption algorithm with which the encryption unit 5 inputs the system parameters p, $d_e$, and $D_e$ to the polynomial generation unit 6 and generates the two $D_e$ degree random polynomials $e_1(x,y)$ and $e_2(x,y)$ having the $d_e$ polynomial as coefficient, may be changed to an algorithm in which $D_e$ polynomials $e_{1,0}(x,y), e_{1,1}(x,y)$ having the $d_e$ polynomial as coefficient, ..., $e_{1,De}(x,y)$ are generated and are multiplied to generate $e_1(x,y)$, and also similarly, $D_e$ polynomials $e_{2,0}(x,y), e_{2,1}(x,y), \ldots, e_{2,De}(x,y)$ having the $d_e$ polynomial as coefficient are generated and are multiplied to generate $e_2(x,y)$.

Figure 15:
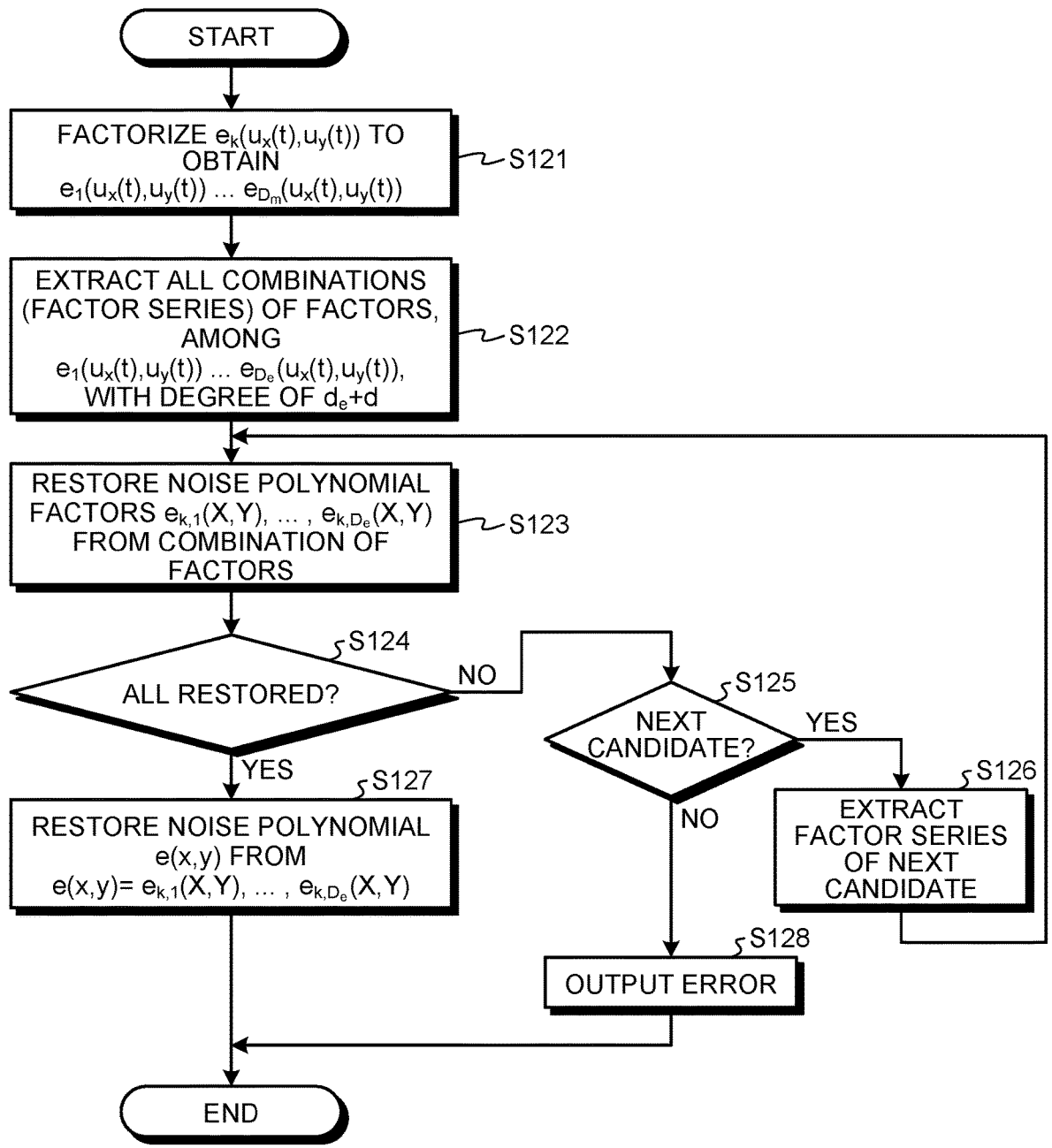
FIG. 15 is a flowchart illustrating an example of a decryption method for a noise polynomial according to a modification of the embodiment.

Regarding the decryption, in the decryption (No. 2), when the random polynomial $s_k(x,y)$ is successfully restored, the decryption unit 23 calculates $e_k(u_x(t),u_y(t))$ from $h_k(t)$ mod $M(u_x(t),u_y(t))$ (k=1, 2) to restore the noise polynomial $e_k(x,y)$. This processing will be described with reference to a flowchart illustrated in FIG. 15 and a block diagram in FIG. 6.

The factorization unit 26 factorizes $e_k(u_x(t),u_y(t))$ (Step S121), and inputs the result of the factorization to the decryption unit 23 based on an array of the order of factors. The decryption unit 23 extracts d and $d_e$ from the memory unit 27, extracts the degree of each factor from the factor array input from the factorization unit 26, and generates a corresponding degree array.

Furthermore, the decryption unit 23 inputs the degree array and $N(=d_e+d)$ corresponding to the degree of the noise polynomial factor to the combination calculation unit 28, and the combination calculation unit 28 extracts all combinations (factor series) of the factors with the degree being exactly N (Step S122) and inputs a list of the factor series to the decryption unit 23.

The decryption unit 23 extracts the factor series from the list and inputs it to the plaintext polynomial factor restoration unit 29, together with the zero point u and the system parameters d and $d_m$. The plaintext polynomial factor restoration unit 29 restores noise polynomial factors $e_{k,1}(x,y), \ldots, e_{k,De}(x,y)$ from the factor series input, the zero point u, and the system parameter d, by the method described in the present embodiment (Step S123).

When all the noise polynomial factors have been successfully restored (Step S124, Yes), the noise polynomial $e(x,y)$ is restored by the product of the noise polynomial factors (Step S127).

If there is a noise polynomial factor that cannot be restored in step S123 (Step S124, No), the plaintext polynomial factor restoration unit 29 transmits an error signal to the decryption unit 23, and the decryption unit 23 determines whether or not there is a next candidate factor series, based on the list of factor series (Step S125). In response to determining that there is the next candidate factor series (Step S125, Yes), the decryption unit 23 extracts the next candidate factor series (Step S126), and inputs the next candidate factor series together with the zero point u and the system parameters d and $d_e$ to the plaintext polynomial factor restoration unit 29, and the processing returns to Step S123.

When there is no next candidate factor series (Step S125, No), the decryption unit 23 notifies the plaintext output unit 30 of the decryption error, and the plaintext output unit outputs a decryption error and empty decryption result (Step S128). As a cause of the decryption failure, it is conceivable that the ciphertext was broken or falsified with on the communication path. There may be an unavoidable case as indicated by the above "Decryption failure probability". Still, with the decryption failure probability sufficiently reduced (to $2^{-64}$ or less for example), the probability of occurrence of such a case may be reduced to a negligible level.

Regarding the variation of changing the roles of the noise polynomial and the plaintext polynomial, the roles of the plaintext polynomial and the noise polynomial of the variations may be simply changed. With this configuration, there will be an option of first restoring the noise polynomial and not restoring the plaintext polynomial factor in the present embodiment. As a result, the processing time can be significantly reduced.

The description of the specific configurations of the encryption device 10, the decryption devices 20 and 20-2, and the key generation device 40 of the present embodiment ends here.

Consideration on Security

The security of the public-key cryptography of the present embodiment implemented will be considered below. Note that the key recovery attack of restoring the private key from the public key is a solution problem of an indeterminate equation without a general solution algorithm. Thus, the considered is made only in the context of a brute-force attack.

Coefficient Comparison Attack

The coefficient comparison attack is an attack scheme in which unknown parts of a plaintext polynomial, a random polynomial, and a noise polynomial in a ciphertext are calculated with variables, and simultaneous equations generated by coefficient comparison with an actual ciphertext are solved to derive the plaintext polynomial together with other unknown parts. According to this scheme, the known part is only the following Formula (94).

$$X(x,y) = \sum_{(i,j,k) \in \Delta_X} \mu_{ijk} x^i y^j t^k \tag{94}$$

The unknown part is expressed by the following Formula (95).

$$m_\ell = \Sum_{(i,j,k) \in \Delta_m} m_{ijk}^{(\ell)} x^i y^j t^k \ (1 \le \ell \le D_m)$$

$$r_b = \Sum_{(i,j,k) \in \Delta_r} r_{ijk}^{(b)} x^i y^j t^k \ (b=1,2)$$

$$s_b = \Sum_{(i,j,k) \in \Delta_s} s_{ijk}^{(b)} x^i y^j t^k \ (b=1,2)$$

$$e_b = \Sum_{(i,j,k) \in \Delta_e} e_{ijk}^{(b)} x^i y^j t^k \ (b=1,2)$$

When a ciphertext is created based on the foregoing Formula (44) by using Formula (94) and Formula (95), the following Formula (96) is obtained for each of b=1 and 2.

$$c_b(x,y) = \prod_{\ell=1}^{D_m} (\Sum_{(i,j,k) \in \Delta_m} m_{ijk}^{(\ell)} x^i y^j t^k)$$
$$(\Sum_{(i,j,k) \in \Delta_s} s_{ijk}^{(b)} x^i y^j t^k) + (\Sum_{(i,j,k) \in \Delta_X} \mu_{ijk} x^i y^j t^k)$$
$$(\Sum_{(i,j,k) \in \Delta_r} r_{ijk}^{(b)} x^i y^j t^k) + \Sum_{(i,j,k) \in \Delta_e} e_{ijk}^{(b)} x^i y^j t^k \tag{96}$$

Coefficient comparison is performed between the above Formula (96) and the actual ciphertext expressed by the following Formula (97). In the formula, $\mu_{ijk}$ and $c^{(l)}_{ijk}$ are known.

$$c_b(x,y) = \sum_{(i,j,k) \in \Delta_{Xr}} c_{ijk}^{(b)} x^i y^j t^k \tag{97}$$

For the sake of simplicity, a description is given assuming that the public key X and a polynomial $c_1(=\Pi_{l=1}^{Dm} m_l s_1 + X r_1 + e_1)$ on $F_p[t]$ corresponding to the public key X are given under the following condition. An attack of analyzing only one of $c_1$ and $c_2$ in this manner is referred to as a one-sided attack. Here, for the sake of simplicity, the discussion will proceed assuming the following Formula (98).

$$D_m = D_s = D_X = D_r = 1, D_e = 0$$

$$d_X = d_m = d_s = d_r = d_e = 0 \tag{98}$$

Then, m, $r_1$, $s_1$, and $e_1$, can be described as in the following Formula (99), and $m_{ijk}$, $s^{(1)}_{ijk}$, $r^{(1)}_{ijk}$ and $e^{(1)}_{ijk}$ are variables that take values on $F_p$.

$$m(x,y) = m_{100} x + m_{010} y + m_{000}$$

$$s_1(x,y) = s_{100}^{(1)} x + s_{010}^{(1)} y + s_{000}^{(1)}$$

$$r_1(x,y) = r_{100}^{(1)} x + r_{010}^{(1)} y + r_{000}^{(1)}$$

$$e_1(x,y) = e_{000}^{(1)} \tag{99}$$

In addition, X and $c_1$ can each be described as in the following Formula (100), and $\tau_{ijk}$ and $^{(1)}_{ijk}$ are constants having values on $F_p$.

$$X(x,y) = \tau_{100} x + \tau_{010} y + \tau_{000}$$

$$c_1(x,y) = c_{200}^{(1)} x^2 + c_{110}^{(1)} xy + c_{020}^{(1)} y^2 + c_{100}^{(1)} x + c_{010}^{(1)} y + c_{000}^{(1)} \tag{100}$$

Through comparison between the terms of $x^2$, $xy$, $y^2$, $x$, and $y$ and the constant term, the simultaneous equations of the following Formula (101) can be obtained.

$$m_{100}s_{100} + \tilde{\tau}_{100}r_{100} = c_{200}$$

$$m_{100}s_{010} + m_{010}s_{100} + \tilde{\tau}_{100}r_{010} + \tilde{\tau}_{010}r_{100} = c_{110}$$

$$m_{010}s_{010} + \tilde{\tau}_{010}r_{010} = c_{020}$$

$$m_{100}s_{000} + m_{000}s_{100} + \tilde{\tau}_{100}r_{000} + \tilde{\tau}_{000}r_{100} = c_{100}$$

$$m_{010}s_{000} + m_{000}s_{010} + \tilde{\tau}_{010}r_{000} + \tilde{\tau}_{000}r_{010} = c_{010}$$

$$m_{000}s_{000} + \tilde{\tau}_{000}r_{000} + c_{000}$$

This simultaneous equation is a nonlinear indeterminate equation because the number of variable is 10 and the number of equations is 6. In general, the number of variables is $\#\Delta_{Dm,Dmdm} + \#\Delta_{Dr,dr} + \#\Gamma_{Ds,ds} + \Gamma_{De,de}$, and the number of equations is $\#\Gamma_{Dx+Dr,dx+dr}$. When $d_X$ and $d_y$ are large, the equations will no longer be indeterminate equation, and will be a solution problem of a nonlinear multivariate simultaneous equation known to be NP-hard. The same applies to a case where both $c_1$ and $c_2$ are taken into consideration.

Linear Algebraic Attack

The linear algebraic attack is an attack scheme of linearizing a nonlinear portion in the coefficient comparison attack and deriving a linear simultaneous equation instead of a nonlinear simultaneous equation. This enables the amount of attack calculation to be reduced. Linearizing the nonlinear portion means setting an unknown part, with the nonlinear portion (that is, a portion corresponding to a product) regarded as a polynomial of a single chunk. In this scheme, since the term (plaintext term) in which the plaintext is embedded is a nonlinear term such as $\Pi_{j=1}^{Dm} m_j(x,y)s_k(x,y)$, this portion is collectively regarded as a single polynomial $M(x,y)$, that is, the ciphertext is expressed by the following Formula (102).

$$c_k(x,y) = M(x,y) + X(x,y)r_k(x,y)r_k(x,y) + e_k(x,y) \quad (k=1,2) \quad (102)$$

The unknown part defined as M, $r_k$, $s_k$, and $e_k$, and is applied to $c_1(x,y)$ by using the parameters expressed in the above expression (98) to obtain the following Formula (103). With the known part X and $c_1$ defined as in the following Formula (104), the following simultaneous equations (105) are derived through a consideration similar to that for the coefficient comparison attack.

$$M_1(x,y) = M_{200}^{(1)}x^2 + M_{110}^{(1)}xy + M_{020}^{(1)}y^2 + M_{100}^{(1)}x + M_{010}^{(1)}y + M_{000}^{(1)}$$

$$r_1(x,y) = r_{100}^{(1)}x + r_{010}^{(1)}y + r_{000}^{(1)}$$

$$e_1(x,y) = e_{000}^{(1)} \quad (103)$$

$$X(x,y) = \tilde{\tau}_{100}x + \tilde{\tau}_{010}y + \tilde{\tau}_{000}$$

$$c_1(x,y) = c_{200}^{(1)}x^2 + c_{110}^{(1)}xy + c_{020}^{(1)}y^2 + c_{100}^{(1)}x + c_{010}^{(1)}y + c_{000}^{(1)} \quad (104)$$

$$M_{200} + \tilde{\tau}_{100}r_{100} = c_{200}$$

$$M_{110} + \tilde{\tau}_{100}r_{010} + \tilde{\tau}_{010}r_{100} = c_{110}$$

$$M_{020} + \tilde{\tau}_{010}r_{010} = c_{020}$$

$$M_{100} + \tilde{\tau}_{100}r_{000} + \tilde{\tau}_{000}r_{100} = c_{100}$$

$$M_{010} + \tilde{\tau}_{010}r_{000} + \tilde{\tau}_{000}r_{010} = c_{010}$$

$$M_{000} + \tilde{\tau}_{000}r_{000} + e_{000} = c_{000} \quad (105)$$

This simultaneous equation is a linear indeterminate equation since the number of variable is 10 and the number of equations is 6. In general, the number of variables is $\#\Delta_{Dx+Dr,dx+dr} + \#\Delta_{Dr,dr} + \#\Gamma_{De,de}$, and the number of equations is $\#\Gamma_{Dx+Dr,dx+dr}$. Thus, a solution space of $\#\Delta_{Dr,dr} + \#\Gamma_{De,de}$ dimensions is obtained. In fact, when an element of any $F_p$ is substituted into the variables $r_{ijk}$ and $e_{ijk}$, corresponding $M_{ijk}$ is obtained. However, there is only one $M_{ijk}$ as a correct decryption result, which can only be determined by confirming that $\Pi_{j=1}^{Dm} m_j(x,y)s_k(x,y)$ is obtained by the factorization of $M(x,y)$ obtained. Only manner (other than by coefficient comparison attack) known so far for achieving this is a brute-force attack on the solution space (other than by coefficient comparison attack). Thus, defense against the brute-force attack can be achieved if a solution space large enough to be free of the attack can be obtained.

Note that, the linear algebra attack also includes a two-sided attack, but the one-sided attack is more effective in terms of brute-force attack on the solution space.

Brute-Force Attack

The resistance to the various attacks described above is basically evaluated by the complexity of computation for solving simultaneous equations. In this section, such factors are reconsidered in the context of brute-force attack. In a case of one-sided coefficient comparison attack, $\Pi_{j=1} m_j(x,y)$ can be obtained by the ideal decomposition as in the case of decryption, through brute-force attack on $e_i(x,y)$. In this case, the number of brute-force attacks $e_i(x,y)$ is $p^{de+1}$ (the characteristic of the finite field to the power of the number of variables), the calculation amount of which also exponentially increases. The same applies to the linear algebra attack.

Also in the key restoration attack, both $(u_x(t), u_y(t))$ need to be obtained for solving multivariate simultaneous equations. This can be achieved through brute-force attack on one of them (for example, $u_x(t)$) and obtaining the corresponding $(u_y(t)$ in this case) by solving $X(u_x(t),y)=0$. Considering these, it is necessary to consider the brute-force attack on $u_x(t)$. Then, the number of brute-force attacks is $p^{de+1}$, the calculation amount of which also exponentially increases.

From the above consideration, it can be understood that any existing attack involves a calculation amount exponentially increasing.

Finally, an example of the hardware configuration of the encryption device 10, the decryption devices 20 and 20-2, and the key generation device 40 of the embodiment will be described.

Example of Hardware Configuration

Figure 16:
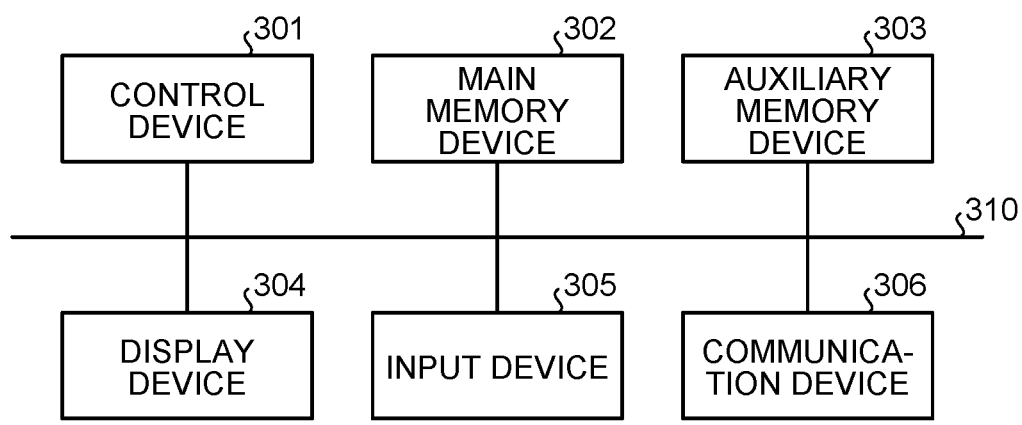
FIG. 16 is a diagram illustrating an example of the hardware configuration of the encryption device, the decryption device, and the key generation device of the embodiment.

FIG. 16 is a diagram illustrating an example of the hardware configuration of the encryption device 10, the decryption devices 20 and 20-2, and the key generation device 40 of the embodiment.

The encryption device 10, the decryption devices 20 and 20-2, and the key generation device 40 of the embodiment include a control device 301, a main memory device 302, an auxiliary memory device 303, a display device 304, an input device 305, and a communication device 306. The control device 301, the main memory device 302, the auxiliary memory device 303, the display device 304, the input device 305, and the communication device 306 are connected to each other via a bus 310.

The control device 301 (an example of the hardware processor) executes a program loaded on to the main memory device 302 from the auxiliary memory device 303. The main memory device 302 is a memory such as a Read Only Memory (ROM) and a Random Access Memory (RAM). The auxiliary memory device 303 is a Hard Disk Drive (HDD), a Solid State Drive (SSD), a memory card, or the like.

The display device 304 displays display information. The display device 304 is, for example, a liquid crystal display or the like. The input device 305 is an interface for operating a computer. The input device 305 is, for example, a keyboard or a mouse. When the computer is a smart device such as a smartphone or a tablet terminal, the display device 304 and the input device 305 are, for example, touch panels. The communication device 306 is an interface for communicating with other devices.

A program executed by a computer may be recorded as a file in an installable format or an executable format, in a computer-readable memory medium such as a CD-ROM, a memory card, a CD-R, and a Digital Versatile Disc (DVD).

Furthermore, the program executed by the computer may be provided while being stored on a computer connected to a network such as the Internet and downloaded via the network. Furthermore, the program executed by the computer may be configured to be provided or distributed over a network such as the Internet, without being downloaded.

Furthermore, the program executed by the computer may be configured to be provided by being embedded in advance in a ROM or the like.

The program executed by the computer has a module configuration including functional blocks that can also be implemented by a program, among the functional configurations (functional blocks) of the encryption device 10, the decryption devices 20 and 20-2, and the key generation device 40 of the embodiment. As the actual hardware, each functional block is loaded onto the main memory device 302, with the control device 301 reading a program from a memory medium and executing the program. Thus, the above functional blocks are generated on the main memory device 302.

Note that some of or all the functional blocks described above may be implemented by hardware such as an Integrated Circuit (IC) instead of being implemented by software.

When implementing the functions using a plurality of processors, each processor may implement one of the functions, or may implement two or more of the functions.

Furthermore, the computer implementing the encryption device 10, the decryption devices 20 and 20-2, and the key generation device 40 of the embodiment may operate in any appropriate mode. For example, the encryption device 10 (the decryption devices 20 and 20-2, the key generation device 40) may be implemented by a single computer. Furthermore, for example, the encryption device 10, the decryption devices 20 and 20-2, and the key generation device 40 may be operated as a cloud system on the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device comprising one or more hardware processors configured to:

acquire a plaintext m from an application;

acquire, as a public key, a single n-variable indeterminate equation $X(x_1, \ldots, x_n)$ ($n \geq 2$) having, as coefficients, elements with a predetermined degree or less of a univariate polynomial ring $F_p[t]$ on a finite field $F_p$;

embed the plaintext m into coefficients of n-variable plaintext polynomial factors $m_i(x_i, \ldots, x_n)$ ($i=1, \ldots, m$) having, as coefficients, elements with a predetermined degree or less of the univariate polynomial ring $F_p[t]$, a number of the n-variable plaintext polynomial factors being one or m which is larger than one;

generate an n-variable plaintext polynomial $M(x_1, \ldots, x_n)$ by multiplying the n-variable plaintext polynomial factors $m_i(x_1, \ldots, x_n)$ whose number is one or m;

randomly generate n-variable polynomials $s_k(x_1, \ldots, x_n)$ (k=1, 2) having, as coefficients, elements with a predetermined degree or less of the univariate polynomial ring $F_p[t]$;

randomly generate n-variable polynomials $r_k(x_1, \ldots, x_n)$ having, as coefficients, elements with a predetermined degree or less of the univariate polynomial ring $F_p[t]$;

randomly generate noise polynomial $e_k(x_1, \ldots, x_n)$ having, as coefficients, elements with a predetermined degree or less of the univariate polynomial ring $F_p[t]$;

generate a ciphertext $c_k(x_1, \ldots, x_n)$ by executing encryption processing of performing an operation including at least one of adding, subtracting, and multiplying the n-variable polynomials $s_k(x_1, \ldots, x_n)$, the n-variable polynomials $r_k(x_1, \ldots, x_n)$, the noise polynomial $e_k(x_1, \ldots, x_n)$, and the single n-variable indeterminate equation $X(x_1, \ldots, x_n)$ to, from, or by the n-variable plaintext polynomial $M(x_1, \ldots, x_n)$; and output the ciphertext $c_k(x_1, \ldots, x_n)$ to the application.

2. An encryption device comprising one or more hardware processors configured to:

acquire a plaintext m from an application;

acquire, as a public key, a single n-variable indeterminate equation $X(x_1, \ldots, x_n)$ ($n \geq 2$) having, as coefficients, elements with a predetermined degree or less of a univariate polynomial ring $F_p[t]$ on a finite field $F_p$;

embed the plaintext m into coefficients of an n-variable plaintext polynomial $M(x_1, \ldots, x_n)$ having, as coefficients, elements with a predetermined degree or less of the univariate polynomial ring $F_p[t]$;

randomly generate n-variable polynomials $s_k(x_1, \ldots, x_n)$ (k=1, 2) having, as coefficients, elements with a predetermined degree or less of the univariate polynomial ring $F_p[t]$;

randomly generate n-variable polynomials $r_k(x_1, \ldots, x_n)$ having, as coefficients, elements with a predetermined degree or less of the univariate polynomial ring $F_p[t]$;

randomly generate noise polynomial $e_k(x_1, \ldots, x_n)$ having, as coefficients, elements with a predetermined degree or less of the univariate polynomial ring $F_p[t]$;

generate a ciphertext $c_k(x_1, \ldots, x_n)$ by executing encryption processing of performing an operation including at least one of adding, subtracting, and multiplying the n-variable polynomials $s_k(x_1, \ldots, x_n)$, the n-variable polynomials $r_k(x_1, \ldots, x_n)$, the noise polynomial $e_k(x_1, \ldots, x_n)$, and the single n-variable indeterminate equation $X(x_1, \ldots, x_n)$ to, from, or by the n-variable plaintext polynomial $M(x_1, \ldots, x_n)$; and output the ciphertext $c_k(x_1, \ldots, x_n)$ to the application.

3. The encryption device according to claim 1, wherein the one or more hardware processors generate noise polynomial factors $e_j(x_1, \ldots, x_n)$ (j=1, ..., d), and generates the noise polynomial $e(x_1, \ldots, x_n)$ by a product of the noise polynomial factors $e_j(x_1, \ldots, x_n)$, a number of the noise polynomial factors being one or d which is larger than one, and generate the ciphertext $c_k(x_1, \ldots, x_n)$ by executing encryption processing of performing an operation including a product of the noise polynomial $e(x_1, \ldots, x_n)$ and the n-variable polynomial $s_k(x_1, \ldots, x_n)$.

4. The encryption device according to claim 1, wherein the one or more hardware processors generate the ciphertext $c_k(x_1, \ldots, x_n)$ by executing encryption processing of performing an operation including at least one of addition and subtraction among a product of the n-variable polynomial $s_k(x_1, \ldots, x_n)$ and the noise polynomial $e_k(x_1, \ldots, x_n)$, a product of the single n-variable indeterminate equation $X(x_1, \ldots, x_n)$ and the n-variable polynomial $r_k(x_1, \ldots, x_n)$, and the n-variable plaintext polynomial $M(x_1, \ldots, x_n)$.

5. A decryption device comprising one or more hardware processors configured to:

acquire a ciphertext $c_k(x_1 \ldots x_n)$ (k=1, 2) from an application;

acquire, as a private key, one or more zero points u of a single n-variable indeterminate equation $X(x_1, \ldots, x_n)$ (n≥2) having, as coefficients, elements with a predetermined degree or less of a univariate polynomial ring $F_p[t]$ on a finite field $F_p$;

generate a univariate polynomial $h_k(t)$ by substituting the one or more zero points u into the ciphertext $c_k(x_1, \ldots, x_n)$ (k=1, 2);

calculate an approximate GCD of the univariate polynomial $h_k(t)$ to obtain a univariate polynomial $M(u)$ representing that the one or more zero points u are substituted into an n-variable plaintext polynomial $M(x_1, \ldots, x_n)$;

obtain an n-variable plaintext polynomial factor $m(x_1, \ldots, x_n)$ having, as coefficients, elements with a predetermined degree or less of the univariate polynomial ring $F_p[t]$ by solving simultaneous linear equations derived from the one or more zero points u;

decrypt a plaintext m based on the coefficients of the n-variable plaintext polynomial factor $m(x_1, \ldots, x_n)$; and output the plaintext m to the application.

6. The decryption device according to claim 5, wherein the ciphertext $c_k(x_1, \ldots, x_n)$ includes a product of the noise polynomial $e(x_1, \ldots, x_n)$ and the n-variable polynomial $s_k(x_1, \ldots, x_n)$, and the noise polynomial $e(x_1, \ldots, x_n)$ is expressed by a product of noise polynomial factors $e_j(x_1, \ldots, x_n)$ (j=1, ..., d) whose number is one or d which is larger than one.

7. The decryption device according to claim 5, wherein the ciphertext $c_k(x_1, \ldots, x_n)$ is expressed by an operation including at least one of addition and subtraction among a product of the n-variable polynomial $s_k(x_1, \ldots, x_n)$ and the noise polynomial $e_k(x_1, \ldots, x_n)$, a product of the single n-variable indeterminate equation $X(x_1, \ldots, x_n)$ and the n-variable polynomial $r_k(x_1, \ldots, x_n)$, and the n-variable plaintext polynomial $M(x_1, \ldots, x_n)$.

8. A computer program product comprising a non-transitory computer-readable recording medium on which an executable program is recorded, the program instructing a computer to:

acquire a plaintext m from an application;

acquire, as a public key, a single n-variable indeterminate equation $X(x_1, \ldots, x_n)$ (n≥2) having, as coefficients, elements with a predetermined degree or less of a univariate polynomial ring $F_p[t]$ on a finite field $F_p$;

embed the plaintext m into coefficients of n-variable plaintext polynomial factors $m_i(x_1, \ldots, x_n)$ (i=1, ..., m) having, as coefficients, elements with a predetermined degree or less of the univariate polynomial ring $F_p[t]$, a number of the n-variable plaintext polynomial factors being one or m which is larger than one;

generate n-variable plaintext polynomial $M(x_1, \ldots, x_n)$ by multiplying the n-variable plaintext polynomial factors $m_i(x_1, \ldots, x_n)$ whose number is one or m;

randomly generate n-variable polynomials $s_k(x_1, \ldots, x_n)$ (k=1, 2) having, as coefficients, elements with a predetermined degree or less of the univariate polynomial ring $F_p[t]$;

randomly generate n-variable polynomials $r_k(x_1, \ldots, x_n)$ having, as coefficients, elements with a predetermined degree or less of the univariate polynomial ring $F_p[t]$;

randomly generate noise polynomial $e_k(x_1, \ldots, x_n)$ having, as coefficients, elements with a predetermined degree or less of the univariate polynomial ring $F_p[t]$;

generate a ciphertext $c_k(x_1, \ldots, x_n)$ by executing encryption processing of performing an operation including at least one of adding, subtracting, and multiplying the n-variable polynomials $s_k(x_1, \ldots, x_n)$, the n-variable polynomials $r_k(x_1, \ldots, x_n)$, the noise polynomial $e_k(x_1, \ldots, x_n)$, and the single n-variable indeterminate equation $X(x_1, \ldots, x_n)$ to, from, or by the n-variable plaintext polynomial $M(x_1, \ldots, x_n)$; and output the ciphertext $c_k(x_1, \ldots, x_n)$ to the application.

9. A computer program product comprising a non-transitory computer-readable recording medium on which an executable program is recorded, the program instructing a computer to:

acquire a plaintext m from an application;

acquire, as a public key, a single n-variable indeterminate equation $X(x_1, \ldots, x_n)$ (n≥2) having, as coefficients, elements with a predetermined degree or less of a univariate polynomial ring $F_p[t]$ on a finite field $F_p$;

embed the plaintext m into coefficients of an n-variable plaintext polynomial $M(x_1, \ldots, x_n)$ having, as coefficients, elements with a predetermined degree or less of the univariate polynomial ring $F_p[t]$;

randomly generate n-variable polynomials $s_k(x_1, \ldots, x_n)$ (k=1, 2) having, as coefficients, elements with a predetermined degree or less of the univariate polynomial ring $F_p[t]$;

randomly generate n-variable polynomials $r_k(x_1, \ldots, x_n)$ having, as coefficients, elements with a predetermined degree or less of the univariate polynomial ring $F_p[t]$;

randomly generate noise polynomial $e_k(x_1, \ldots, x_n)$ having, as coefficients, elements with a predetermined degree or less of the univariate polynomial ring $F_p[t]$;

generate a ciphertext $c_k(x_1, \ldots, x_n)$ by executing encryption processing of performing an operation including at least one of adding, subtracting, and multiplying the n-variable polynomials $s_k(x_1, \ldots, x_n)$, the n-variable polynomials $r_k(x_1, \ldots, x_n)$, the noise polynomial $e_k(x_1, \ldots, x_n)$, and the single n-variable indeterminate equation $X(x_1, \ldots, x_n)$ to, from, or by the n-variable plaintext polynomial $M(x_1, \ldots, x_n)$; and output the ciphertext $c_k(x_1, \ldots, x_n)$ to the application.

10. The computer program product according to claim 8, wherein the program further instructs the computer to:

generate noise polynomial factors $e_j(x_1, \ldots, x_n)$ (j=1, ..., d), and generates the noise polynomial $e(x_1, \ldots, x_n)$ by a product of the noise polynomial factors $e_j(x_1, \ldots, x_n)$, a number of the noise polynomial factors being one or d which is larger than one; and generate the ciphertext $c_k(x_1, \ldots, x_n)$ by executing encryption processing of performing an operation including a product of the noise polynomial $e(x_1, \ldots, x_n)$ and the n-variable polynomial $s_k(x_1, \ldots, x_n)$.

11. The computer program product according to claim 8, wherein the program further instructs the computer to generate the ciphertext $c_k(x_1, \ldots, x_n)$ by executing encryption processing of performing an operation including at least one of addition and subtraction among a product of the n-variable polynomial $s_k(x_1, \ldots, x_n)$ and the noise polynomial $e_k(x_1, \ldots, x_n)$, a product of the single n-variable indeterminate equation $X(x_1, \ldots, x_n)$ and the n-variable polynomial $r_k(x_1, \ldots, x_n)$, and the n-variable plaintext polynomial $M(x_1, \ldots, x_n)$.

12. A computer program product comprising a non-transitory computer-readable recording medium on which an executable program is recorded, the program instructing a computer to:

acquire a ciphertext $c_k(x_1, \ldots, x_n)$ (k=1, 2) from an application;

acquire, as a private key, one or more zero points u of a single n-variable indeterminate equation $X(x_1, \ldots, x_n)$ (n≥2) having, as coefficients, elements with a predetermined degree or less of a univariate polynomial ring $F_p[t]$ on a finite field $F_p$;

generate a univariate polynomial $h_k(t)$ by substituting the one or more zero points u into the ciphertext $c_k(x_1, \ldots, x_n)$ (k=1, 2);

calculate an approximate Greatest Common Divisor (GCD) of the univariate polynomial $h_k(t)$ to obtain a univariate polynomial M(u) representing that the one or more zero points u are substituted into an n-variable plaintext polynomial $M(x_1, \ldots, x_n)$;

obtain an n-variable plaintext polynomial factor $m(x_1, \ldots, x_n)$ having, as coefficients, elements with a predetermined degree or less of the univariate polynomial ring $F_p[t]$ by solving simultaneous linear equations derived from the one or more zero points u;

decrypt a plaintext m based on the coefficients of the n-variable plaintext polynomial factor $m(x_1, \ldots, x_n)$; and output the plaintext m to the application.

* * * * *